United States Patent [19]

Oldershaw

[11] Patent Number: 4,814,875
[45] Date of Patent: Mar. 21, 1989

[54] DIGITAL ENVELOPE SHAPING APPARATUS

[75] Inventor: Reginald W. Oldershaw, Redwood City, Calif.

[73] Assignee: Ampex Corporation, Redwood City, Calif.

[21] Appl. No.: 853,304

[22] Filed: Apr. 17, 1986

Related U.S. Application Data

[63] Continuation-in-part of Ser. No. 789,069, Oct. 17, 1985, abandoned.

[51] Int. Cl.⁴ .............................................. H04N 5/06
[52] U.S. Cl. .................................... 358/150; 358/148
[58] Field of Search ............... 358/150, 151, 148, 265, 358/160, 175; 328/63, 160

[56] References Cited

U.S. PATENT DOCUMENTS

| 3,633,105 | 4/1972 | Lender et al. | 325/42 |
| 3,810,067 | 7/1974 | Heidecker | 328/164 |
| 4,024,571 | 5/1977 | Dischert et al. | 358/4 |
| 4,482,974 | 11/1984 | Kovalick | 364/607 |
| 4,535,357 | 8/1985 | Penney | 358/150 |
| 4,663,654 | 5/1987 | Morrison | 358/165 |

Primary Examiner—James J. Groody
Assistant Examiner—Michael D. Parker
Attorney, Agent, or Firm—Ronald C. Fish; Ralph L. Mossino; Richard P. Lange

[57] ABSTRACT

There is disclosed herein a system for digitally forming synchronization signals. In the preferred embodiment, these synchronization signals are for substitution in place of the original synchronization signals in a television signal. These digitally generated synchronization signals are generated synchronously with the digitization of the video portions of the television signal, and the digitally generated synchronization signals are multiplexed into the stream of digital video data in the appropriate blanking intervals. The system uses a first digital signal number generator to generate a plurality of digital signals which represent the peak amplitudes of the desired synchronization signals. A second digital signal number generator synchronously generates a second plurality of digital signal values representative of the shape of the desired edges for the synchronization signal being generated. The second first and second digital signal number generators are synchronized with the clock controlling the input of the digitized video signals into the system and receive reference signals indicating when the first and second pluralities of digital signal values are to be generated and their intervals. During the appropriate blanking interval, the first and second pluralities of digital values are multiplied, and the products are output to be added to the input video signal. During times other than the blanking intervals, the incoming digitized video is multiplied by a digital gain value. The resultant stream of digital values are coupled to a digital to analog converter. The resulting analog level signal is passed through a low pass filter having specific characteristics to derive the analog television signal. There is also apparatus to allow the user to digitally adjust the sync to subcarrier phase by selecting a different one of a family of sets of digital transition edge gain control values.

53 Claims, 12 Drawing Sheets

DIGITAL ENVELOPE SHAPING APPARATUS

This is a continuation-in-part of copending application Ser. No. 789,069, Oct. 17, 1985 now abandoned which is assigned to the assignee of the present case

BACKGROUND OF THE INVENTION

The invention pertains to video signal processing devices for generating television synchronization signals for combining with the video signal being processed. More particularly, the invention relates to television synchronizing signal waveform generators in which the various synchronizing signals to be combined with the video signal are generated digitally.

A television signal is a composite of several different signal components, generally, falling within one of two classes of signals, namely, a video information signal component and several synchronizing signal components. The common television signals are formed of lines or horizontally distributed video information separated by intervals of horizontal line relates synchronizing signals defining the beginning of each line. The horizontal lines are further organized into rasters of vertically distributed lines defining fields of lines separated by vertical field related synchronizing signals. In turn, the fields are organized into frames, each composed of two interlaced fields of horizontal lines, with lines of each field having a different raster position upon display. The various synchronizing signals included in television signals serve to synchronize the processing of the television signals and the operation of the processing and other television signal utilization devices.

In color television signals, the synchronizing signals include vertical and horizontal blanking intervals, each formed of a composite of several synchronizing signals. The vertical blanking interval includes a vertical blanking level extending between leading and trailing signal transition edges that determine the durations of the vertical blanking interval. Onto this blanking level is impressed a number of horizontal blanking intervals, a number of equalization pulses, a serrated pulse interval defining a vertical sync pulse, and a burst (typically 9 to 11 cycles) of the sinusoidal chrominance subcarrier signal (color burst) following each horizontal sync pulse during about the latter one-half of the vertical interval. Each horizontal blanking interval during the latter one-half of the vertical blanking interval and the entire field of lines between consecutive vertical blanking intervals includes a horizontal blanking level extending between leading and trailing signal transition edges that determine the duration of the horizontal blanking interval. Impressed on each horizontal blanking level is a horizontal sync pulse followed by a color burst. One horizontal sync pulse and one color burst are provided for each horizontal lines of the television signal and serve to keep the horizontal scanning and color generation synchronized. The vertical sync pulse is provided for each field of the television signal to keep vertical scanning synchronized. The serrations of the vertical sync pulse prevent loss of horizontal scanning synchronization. Equalization pulses are provided to insure proper scanning motion synchronization with the required interlacing of the two fields that compose a television frame. The horizontal and vertical blanking levels serve to blank the display during horizontal and vertical retraces, with the associated transition edges effecting a smooth signal change between the video information signal intervals and the blanking intervals.

Proper display and processing of television signals requires precise formation of the synchronizing signals and insertion of them within the television signal. In the generations of television signals, the video information is usually generated separately from the synchronizing signals, with the two being added together, i.e., combined, in a multiplexer. Furthermore, during post-generation processing of television signals, new synchronizing signals are usually inserted in the processed television signals. This combining or insertion is performed at the conclusion of the generation or processing to avoid the introduction of timing disturbance to and the degradation of the synchronizing signals. Moreover, transmission of television signals through communication channels often introduces such disturbance and degradation. A video tape recorder (VTR) is an example of such a communication channel. Following such transmission, new synchronizing signals are inserted in the television signal to restore it to its proper form. Video processing amplifiers are commonly employed to insert the television synchronizing signals into the video information.

One particular important timing relationship between the various components of color television signals is the phase of the color burst relative to the horizontal sync pulse. The phase of the burst is commonly measured relative to the 50% point of the leading edge of the preceding horizontal sync pulse. If noise, signal transmission, or VTR operation distorts the synchronizing signals, it usually leads to incorrect processing and display of the television signal.

Such distortion often has the particularly undesirable effect of altering the phase of the synchronizing signals. This phase alteration complicates the processing of television signals, particularly, when provided by different television signal sources or when a television signal experiences several record and reproduce sequences creating multiple generations of the television signal. For example, distortions of the edges of the horizontal sync pulses can result in errors of measurement of the phase of the color burst, with different distortions producing different measurement errors. If several VTRs or other television signal sources are used to generate a program and the phase stability is not maintained between the several sources, different color burst phase measurement errors can result, leading to the inserting of color burst at a different phase relative to the edge of horizontal sync for signals received from different sources. If, for example, one VTR is used as a source of an entertainment program, and another VTR is used as the source of a commercial or bulletin, when a switch of sources is made, the phase of color burst relative to horizontal sync may suddenly shift because of the phase difference between the two sources. This can cause a sudden shift in the hue of the objects in the displayed television picture. Creating multiple generations of a television signal also can lead to such undesirable results, because each record and reproduce sequence often is accompanied by small distortion of the sharp signal transition edges, which can accumulate with each generations of the television signal and produce noticeable degradations in the display of such television signals.

Further, there exist national standards, such as NTSC RS170A standard, which exactly specify the time duration, rise time, edge shape, and time relation between the varous components of a composite video signal for public transportation, including very specific standards regarding the shapes and times of occurrence of the synchronizing signals contained in the composite television signals. Such precise standards must be met for proper function of video systems. This is the reason new synchronizing signals are locally generated and inserted into the video signal being processed in place of the original synchronizing signals.

In existing video processing devices, such as used in digital time base correctors, it is common to convert the digitized video to analog form before insertig the synchronizing signals. This process and architecture have several drawbacks, including crosstalk and phase drift and other forms of instability. Generally, the digitized video is converted to analog form and synchronizing signals are generated in filters for insertion at the proper location relative to the video information. However, the circuitry that handles the video information portion of the television signal generally is in close proximity to the synchronizing signal generating circuitry and signal lines in each circuit have a certain amount of inductive coupling to each other. Since relatively narrow pulse widths and sharp rise times are characteristic of the synchronizing signals, high frequency components are generated which can be radiated and picked up on the video information circuitry as crosstalk. Such crosstalk can cause undesirable disturbances in the displayed video information.

The problem of phase instability also arises in systems where the video information is digitized, and the inserted synchronizing signals are generated in analog form. Generally, the analog circuits used to generate the synchronizing signals are not locked in synchronization with the clock driving the digital video information processing circuitry. This lack of a locked synchronization relationship naturally leads to variations in the phase between the analog synchronizing signals and the digital video data.

Thus, a need exists for a system for digitally generating television synchronizing signals and combining them in synchronization with the video information so that a stable phase relationship is maintained between the synchronizing signals and the video information with which they are combined.

In accordance with the present invention, television synchronizing signals to be combined with television video information in a signal combiner are generated digitally by a digital number generator that provides digital signal values representative of the amplitude peaks of the synchronizing signals. For monochrome television signals, digital signal values are provided that represent the amplitude peaks of the blanking levels and the sync and equalizing pulses. If color television signals are formed, digital signal values also are provided that represent the amplitude peaks of the several cycles of color burst that follow the horizontal sync pulse. The times and intervals of the generation of the digital signal values are determined by a reference signal that identifies when the synchronizing signals are to be inserted in the video information signal. This reference signal is coupled to control the digital number generator so that it issues the appropriate digital signal values at the appropriate times for the appropriate duration. To assure the insertion of the synchronizing signals correctly within the video information signal, the reference signal also is employed to synchronize the transmission of the video information signal through its signal path preceding the signal combiner so that the arrivals of synchronizing signals and video information signal at the signal combiner are coordinated to effect the desired combining of the signals.

The generated digital signal values precisely define the amplitude peaks, but not the edges of the synchronizing signals. As described hereinbefore, the signal transition and other edges of the synchronizing signals are precisely specified for television signals used for public broadcast. In such signals, these edges are defined by complementary sine squared functions, one for rising edges and the other for falling edges. The sine squared function is given by the expression $$y=(\sin x)^2$$

where x has values from 0° to 90°. The complement is given by the expression
$$y=1-(\sin x)^2$$

A particularly salient feature of the present invention involves the technique of processing the digital signal values provided by the first digital number generator to effect the shaping of the edges forming the synchronizing signals according to the sine squared functions. More particularly, a plurality of digital gain control values representative of a sine squared edge shape are generated by a second digital number generator to occur synchronously with the commencement and conclusion of each synchronizing interval. The times and intervals of the generation of the digital gain control values are determined by the aforementioned reference signal that identifieswhen the synchronizing signals are to occur in the video information signal. This reference signal is coupled to control the second digital number generator so that it issues the appropriate digital gain control values at the appropriate times for the appropriate duration. The generated gain control values are coupled to a first input of a digital multiplier. A second input of the multiplier is coupled to receive the digital signal values provided by the first mentioned digital number generator. In the multiplier, the digital signal values are multiplied by the digital gain control values and, thereby, adjust the digital signal values at the commencements and conclusions of the synchronizing signals according to the sine squared function represented by the digital gain control values.

In another embodiment, the digital signal values defining the peak amplitudes and the digital gain control values defining the shapes of the edges of the digitally synthesized synchronizing signals may be multiplied "in front" of the multiplexer. The multiplexer inputs would then be the video information signals on one channel and the already multiplied numbers representing the digitally synthesized synchronization signals on the other channel. The multiplexer is switched at appropriate times to place the digitally synthesized synchronization signals in the appropriate places in the composite television signal being generated.

For other than conventional television signals, the transition edges of the synchronizing signal may be defined by functions other than the sine squared function. For such other television signals, the digital gain control values are selected to effect the shaping of the transition edges according to the function or functions required for proper shaping of the synchronizing signals.

According to a particularly advantageous feature of the present invention, an addressable memory is employed to store digital gain control values from which the edges of the synchronizing signals are generated. The generation of the digital gain control values for a particular edge of a particular synchronizing signal is achieved through the control of the address generator that effects retrieval of the digital gain control values from the memory storage locations. While a separate set of gain control values could be stored and retrieved for each edge of each synchronizing signal to be combined with the video information, the preferred embodiment is featured by storing a single set of digital gain control values from which all edges required of al synchronizing signals for a particular television standard are generated. Moreover, the single set of stored digital gain control values are employed for forming the rising and falling edges defined by related, but complementary, sine square functions. Complementary digital gain control values for one kind of edge, for example, a falling edge, before providing them to the multiplexer, while providing uncomplemented values to the multiplier for the other, rising edge. This complementing is conveniently accomplished in the preferred embodiment by controlling the address generator to effect retrieving the gain control values in reverse sequences for the complemented and uncomplemented values. The use of an addressable memory in this manner greatly simplifies and facilitates the generation of the digital gain control values.

For analog television signal utilization devices, such as television signal display monitors, the composite digitized television signal is coupled to a digital to analog (D/A) converter. The D/A converter is operated to convert to analog signal from both the digitized video information signal component of the composite television signal and the digitized synchronizing signal components combined with the video information signal component to form the composite digitized television signal. A filter cooperates with the D/A converter to form the usual continuous composite analog television signal from the series of discrete analog amptitude values customarily provided by the converter. To simplify this formation of the analog television signal, a single, low pass filter is used, with the filter selected to have an upper corner frequency of a little less than two times the color subcarrier frequency and an upper stop band that rolls off to at least −6 decibels (dB) at a frequency of two times the color subcarrier frequency and to at least −55 dB at a frequency of three times the color subcarrier frequency. A single filter with the foregoing characteristics enables the smoothing of the entire composite television signal provided by the A/D converter in the form of a series of discrete amplitude values.

By generating the television synchronizing signals in the digital domain synchronously with the timing of the video information signal with which it is to be combined, combining the digitized synchronizing signals with the video information signal that is compatibly digitized to form a digitized composite television signal, and processing the composite television signal without separating the video information signal component from the synchronizing signal components while preparing the composite signal for use by a television signal utilization device, it is possible to provide television signals with precisely shaped synchronizing signals, while establishing and maintaining stable phase relationships between the various synchronizing signals themselves as well as between them and the associated video information signal.

The foregoing and other features and advantages of the present invention will become more apparent from the following description and claims together with the appended drawings, in which:

Figure 4A:
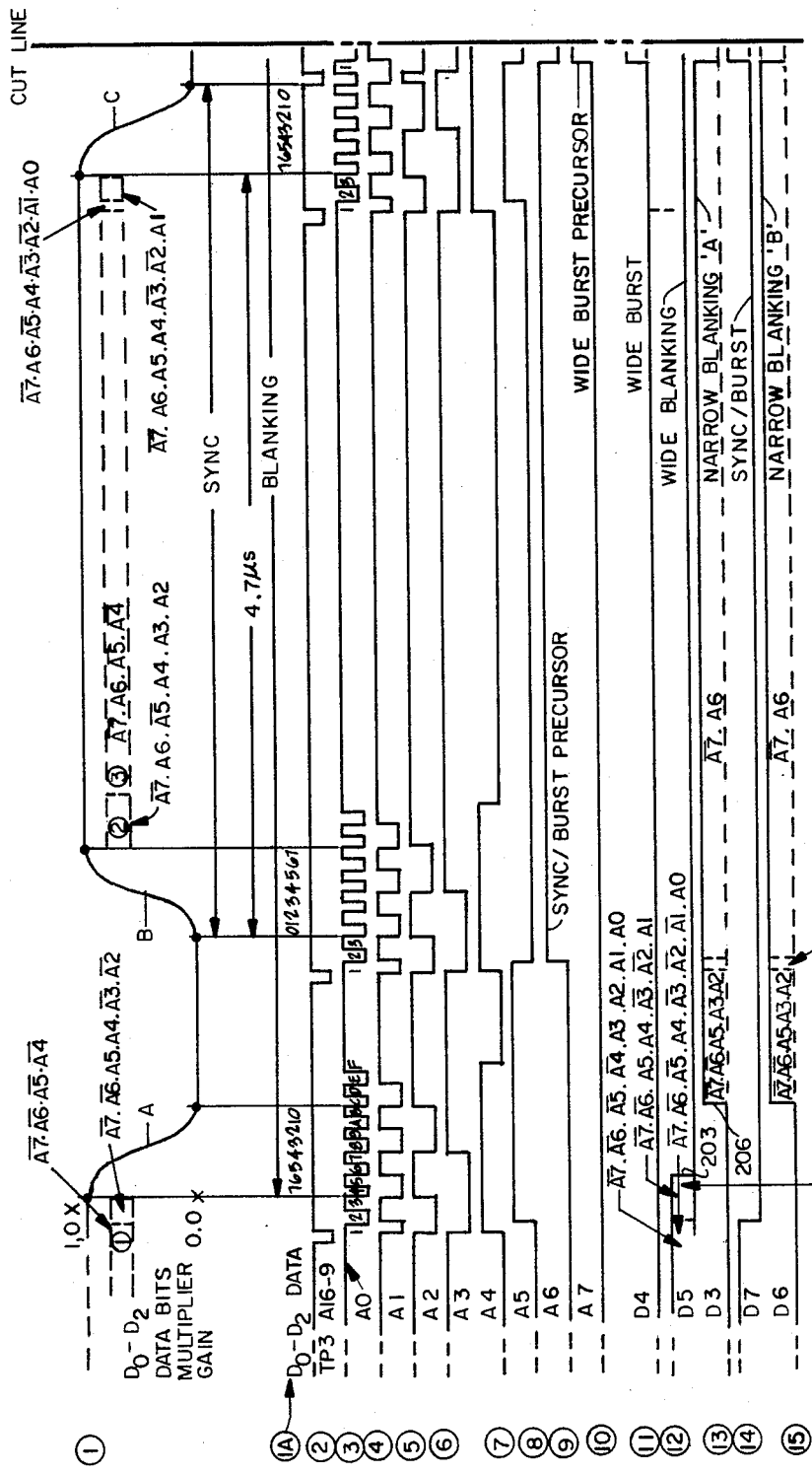
Figure 4B:
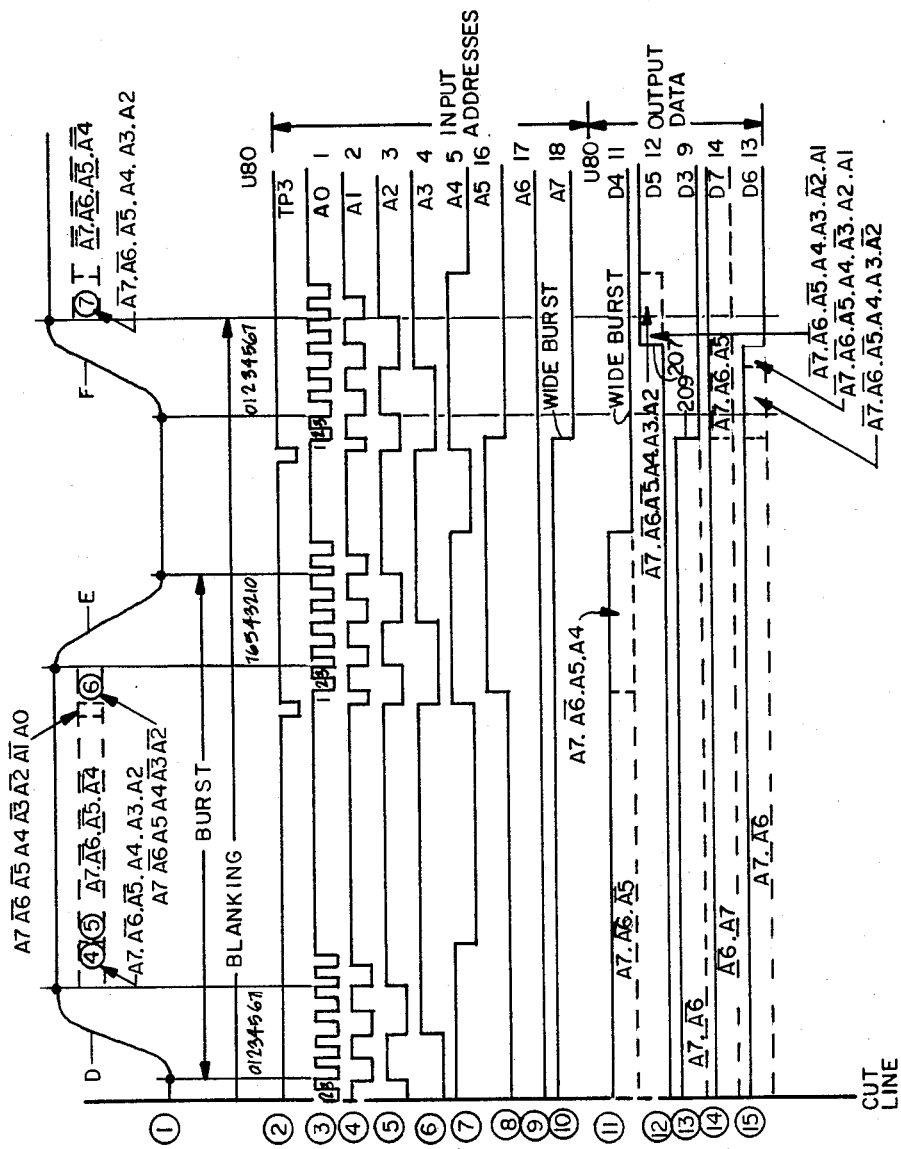

FIGS. 4A and 4B together comprise a timing diagram of the various signals involved in the generation of the various signals which are provided to the multiplier for forming the television synchronizing signals.

Figure 1:
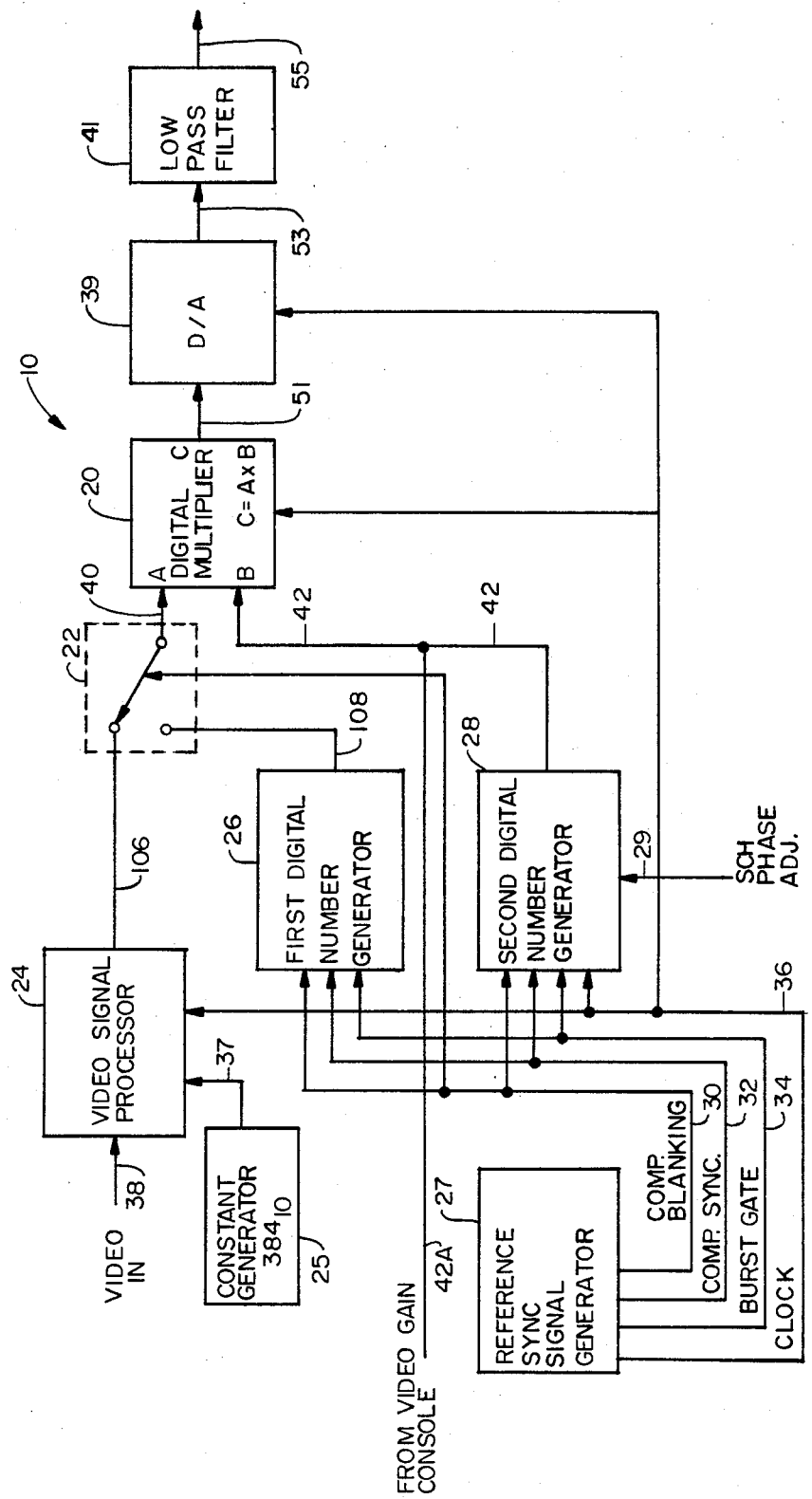
FIG. 1 is a block diagram of a preferred embodiment of the invention.

FIGS. 5A–5E together comprise a logic diagram of the preferred embodiment of the invention of FIG. 1 but omitting the D/A converter and the low pass filter.

Figure 6:
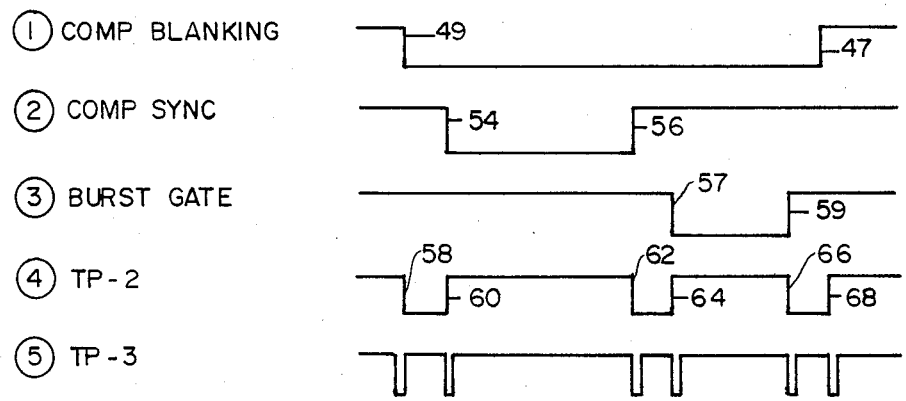

FIG. 6 is a timing diagram of the various signals used in causing the genaeration of the address signals and timing signals controlling the first and second digital signal generators.

Figure 7:
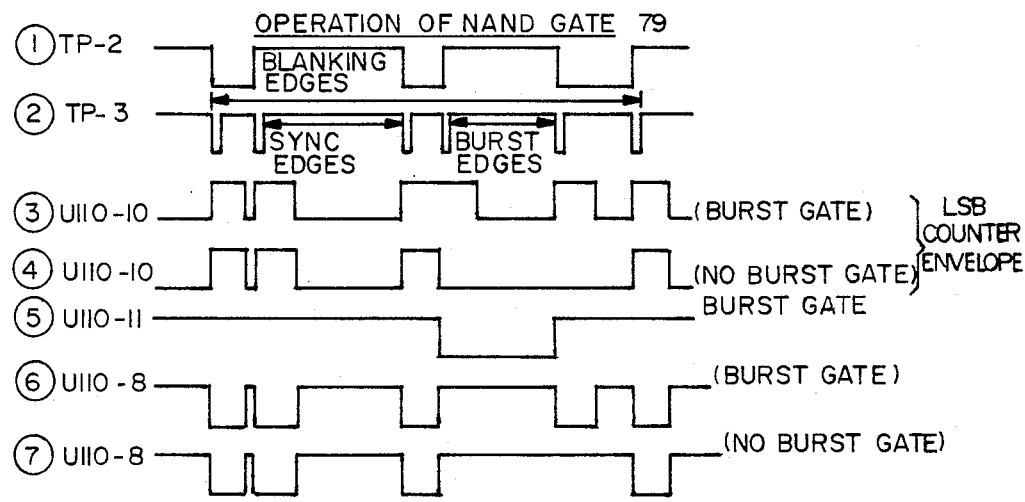

FIG. 7 is a timing diagram of various signals used to clock the logic which generates the WIDE SYNC and WIDE BURST signals.

Figure 8:
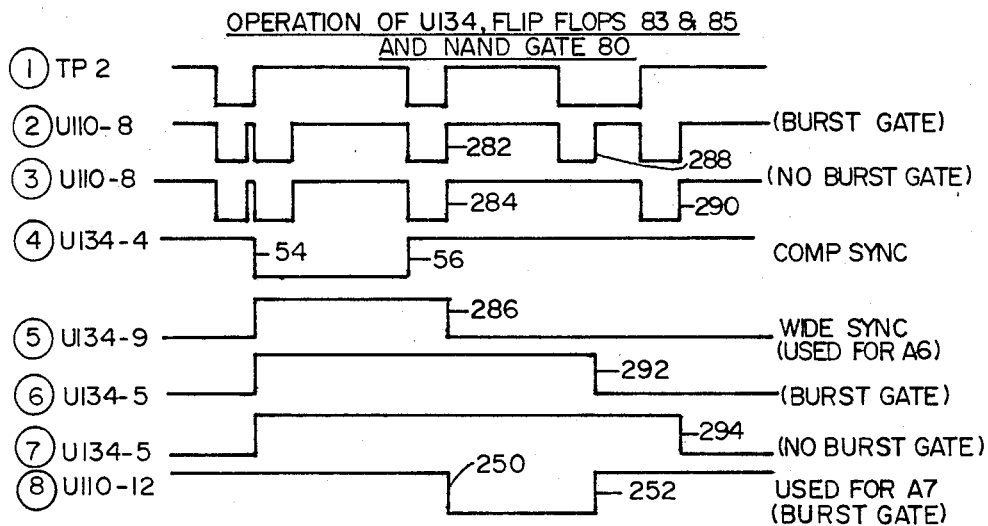

FIG. 8 is a timing diagram of signals involved in forming the WIDE SYNC and WIDE BURST signals.

Figure 9:
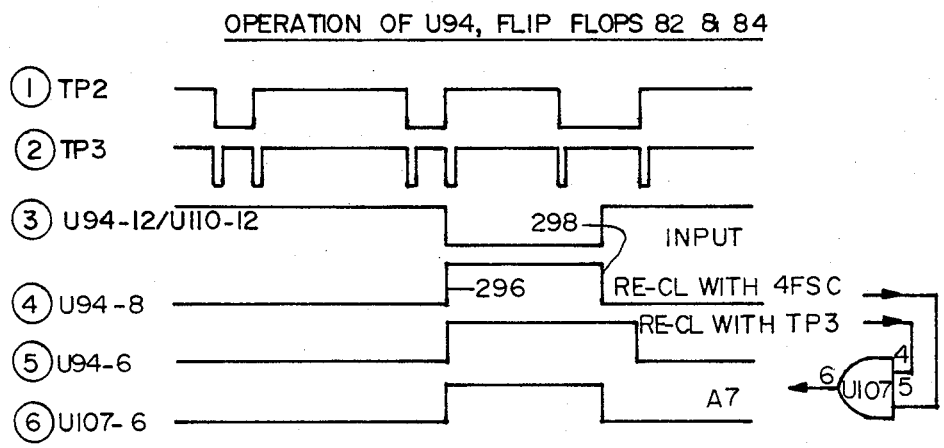

FIG. 9 is a timing diagram of signals generated in forming the WIDE BURST signal.

Figure 10:
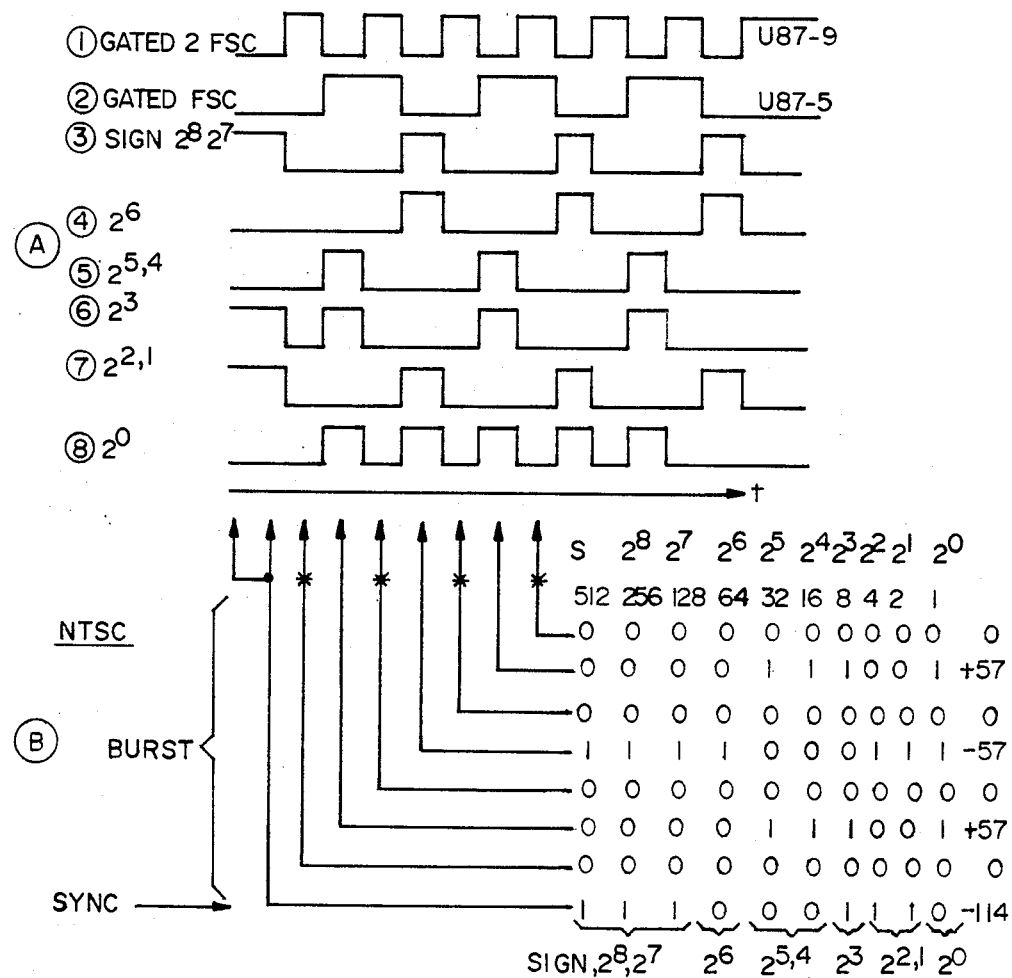

FIG. 10 is a timing diagram and truth table for the signals in the first digital signal generator which represent in binary form the peak amplitudes of the synchronizing signals to be synthesized.

A block diagram of a preferred embodiment of the television synchronizing signal generator 10 of the present invention is illustrated in FIG. 1. As generally described previously, digital forms of television synchronizing signals are generated and combined with video information signals to form a desired composite television signal in accordance with the present invention. Therefore, it is preferred the video information signals be presented in a compatible digital form for combining with the digital synchronizing signals. The video information signal to be combined with the synchronizing signals is provided by a video signal processor 24 over line 106 that extends to a signal combiner, such as multiplexer 22, which is operated to effect the combining of the two signals. The video signal processor 24 is arranged to prepare the video information signal for combining with the synchronizing signals. If the video information signal is in analog form as received by the processor 24 on a line 38, such as would be case if the signals are provided by conventional television cameras, the processor is arranged to have analog to digital converters that encode the video information signal into the compatible digital form. Such video analog to digital signal processing circuitry is well known, and is found in many existing video processing amplifiers. However, many television signal sources, such as VTRs, provide video information signals in digital forms. When digital video information signals are provided to the video signal processor 24, the processor is arranged to have circuitry to be described in further detail hereinafter that serves to establish the required signal levels in the digital video signals and the time of the presentation of the signals to the multiplexer 22 for combining with the digital synchronizing signals. In either case, the processing performed by the video signal processor 24 is controlled by a clock signal provided on line 36 by a reference signal generator 27. The timing of the presentation is achieved by reclocking the samples forming the digital video information signal in a latch using a clock signal having the desired timing. Customarily, the clock signal is at a frequency corresponding to the desired data rate of the video information signal. The preferred embodiment of the invention is arranged to form color television signals from digital video information signals having a data sampling rate of 4 times the frequency of the nominal subcarrier signal of the video signal, commonly designated 4Fsc, which therefore is the frequency selected for the clock signal on the line 36.

The preferred embodiment of the television synchronizing signal generator 10 is arranged to operate with digital video information signals and digital synchronizing signals in the form of 9-bit binary words. Therefore, the multiplexer 22 is coupled to receive these signals over lines 106 and 108 in the form of 9 line buses. The bus 106 extends from processor 24 to a first or "A" input of two input of the multiplexer 22. A second or "B" input of the multiplexer 20 is coupled to receive over bus 108, digital signals representative of the peak amplitudes of various synchronizing signals to be combined with the received video information signal. As will be described hereinafter, the timing of the provision to the multiplexer 22 of the series of binary words forming the digital synchronizing signals is also controlled by a compblanking signal present on line 30, whereby the video information signal and synchronizing signals are combined by the multiplexer without the introduction of phase discontinuities at the transitions between the two signals. The combining of the signals is achieved by further controlling the multiplexer 22 so that its output is alternately coupled to bus 106 during intervals when the video information signal is to appear in the composite television signal being formed, and is coupled to bus 108 during intervals when the synchronizing signals are to appear in the television signal. This control is exercised by a two state signal provided by the reference synchronizing signal generator 27 that signifies when intervals of video information and synchronizing signals are to occur in the composite television signal. Generators of reference composite television signals for use in sychronizing the operations of television signal processors are well known to those skilled in the art. They commonly provide a composite blanking reference signal (COMP BLANKING) that conveniently is used to the purpose of causing switching in the multiplexer 22 in the preferred embodiment of the invention. The COMP BLANKING signal reference is provided over line 30 and is a two state signal that is active to signify the duration of the horizontal and vertical blanking intervals contained within the reference color television signal.

In accordance with a particularly salient feature of the present invention, each of the synchronizing signals to be combined with the video information signals is formed from two separately component and a digital amplitude peak component. Following generation, these components are coupled to a digital signal combiner, which is a digital multiplier 20 in the preferred emboidment of the present invention. The digital amplitude peak components are generated by a first digital number generator 26 that is operated to provide signal amplitude values in a digital form that represents amplitude peaks of the various synchronizing signals to be combined with the digital video information signal. As previously described with respect to color television signals, this first digital number generator 26 provides digital amplitude values that represent the peak amplitudes of the horizontal and vertical blanking levels, the peak amplitudes of the horizontal sync pulses, the amplitude of the interval between peak amplitudes of the serrations in the vertical sync pulse interval, the peak amplitude of the equalizer pulses, and the peak amplitudes of the burst color subcarrier cycles. In the common color televisions signals, these amplitude peaks are conveniently defined by only a few different values. For NTSC color television signals, one value defines the horizontal and vertical blanking levels, the amplitudes of the intervals between pre and post equalizing pulses, and the amplitudes of the intervals between serrations in the vertical sync interval. Another value defines the amplitude peaks or tips of the horizontal sync pulses, of the equalizing pulses and of the serrations in the vertical sync interval, and two additional values define the amplitude peaks of the sine wave forming color burst television signal. PAL color television signals have synchronizing signals whose amplitude peaks are defined by a like number of different valules, with the values differing somewhat from those of NTSC color television signals. SECAM color television signals are considerably different from NTSC and PAL signals, but their synchronizing signals also can be defined by a few different values.

Regardless of the standard of the color television signal being processed, the required synchronizing signal peak amplitude values are generated in the preferred embodiment by logic contained within the first digital number generator 26, which will be described in further detail hereinafter with reference to FIGS. 5A-5E. The operation of the logic is controlled by reference synchronizing signals provided by the reference synchronizing signal generator 27 over lines 30, 32, and 34. The COMP BLANKING signal provided on line 30 signifies the timing for the starting times and durations of the horizontal and vertical blanking intervals. The COMP SYNC signal (composite synchronization) provided by generator 27 on line 32 is a two state signal that is active to signify the starting times and durations of the equalizer, horizontal sync, and vertical sync pulses and the vertical serrations in the vertical sync pulses contained within the reference color television signal. The BURST GATE signal provided by the reference synchronizing signal generator 27 on line 34 is another two state signal that is active to signify the duration of the color burst interval contained within the reference color television signal. As will be described in further detail with reference to FIG. 5A-5E, the states of these synchronizing signals are detected and decoded by the first digital number generator 26 so that the first number generator provides the proper peak amplitude digital values to the signal combiner 22 for combining with the video information signal at the proper times for digital synthesis of the various synchronizing signals.

Because only a few different digital values are required to generate peak amplitude values for the various synchronizing signals, the first digital number generator can be implemented by relatively simple logic. Alternatively, if desired, an addressable memory can be utilized to store the needed values and provide them for forming the synchronizing signals in accordance with addresses determined by the afore-described reference synchronizing signals.

The digital transition edge component is generated by a second digital number generator 28 that is operated to provide signals according to functions determined by the color television signal standard of interest that define the shapes of the signal transition edges of the various synchronizing signals to be combined within the video information signal. Convenient to the implementation of the present invention for color television signals defined by the common international television standards, all such edges are described by the previously discussed sine squared expression although the rise times can differ between different standards. The preferred embodiment of the present invention takes advantage of this convenience by providing a single set of signal values in digital form for use in forming all edges of all synchronizing signals for a particular television standard. More particularly, and as will be described in further detail hereinafter with reference to FIGS. 5A-5E, the single set of values is stored in an addressable PROM memory. Although it is true that a single set of values define the shape of each edge in the synchronizing signals being formed so as to comply with a particular television standard, there are stored in the PROM several sets of families of such data for describing the same shape of edge bu slightly different in phase than the other edges relative to the burst interval. This allows the sync to subcarrier phase to be altered digitally with very little drift by selecting a different family of sample points defining the same shape edge but moved slightly in time relative to the zero crossings of the color burst synchronization signals.

The addressing of the PROM storign the edge defining gain control values is also controlled by the aforementioned synchronizing signals provided by the reference synchronizing signal generator 27 over lines 30, 32, 34. The states of the signals are examined by the second digital number generator 28 and address signals generated accordingly to address the memory so that the number generator provides the proper values determining the desired shape of the signal transition edges for the various synchronizing signals. Values for rising and falling edges are conveniently generated by providing two sets of values according to complementary sine squared functions, with the values depicting the uncomplemented sine squared function defining rising edges and those depicting the complemented sine squared function defining falling edges. While two sets of values can be stored in the memory for this purpose, the preferred embodiment requires only one set of values from which the two complementary sets of digital gain values are generated. Furthermore, while a digital signal complementing means separate from the addressable memory can be employed to generate the complementary set of values from uncomplemented values stored in the memory (or vice versa for that matter), the preferred embodiment provides the two sets by simply reversing the sequence of addressing the memory to retrieve the stored values. Thus, it will be appreciated that only a few digital signal values need be available for forming all signal transition edges for all synchronizing signals to be combined with the video transitions edges coupled with the use of only a few values for forming all signal peak amplitudes of thes ynchronizing signal provide an extremely simple method of digitally generating television synchronizing signals for combining with a video information signal.

A single set of transition edge defining digital values is satisfactory for forming synchronizing signals that are combined with video information signals having a known, fixed phase. However, if it is desired to construct the television synchronizing signal generator 10 for operation with television signal processing devices handling video information signals of various phases, as would be necessary if one digital synchronizing signal generating system were to be used with several different television standards or if variation in the sync to subcarrier phase were to be implemented, then a single set of edge shaping gain control values is inadequate. In such embodiments, it is preferred to provide a separate set of transition edge defining digital values for each of the various desired sync to subcarrier phases. While it is possible to pass the digital values through a separate adjustable delay to account for the various phases of the video information signal, the need for a large number of different phases would mandate an exceedingly complex delay device that would have to be clocked at prohibitively high rates to enable precise generation of each of the delays.

In embodiments arranged to form synchronizing signals having different sync to subcarrier phases relative to a reference phase, the capacity of the memory contained within the second number generator 28 is arranged to store the required number of sets of digital values. To effect the selective retrieval of the stored sets from memory, a system phase addressing control signal comprised of the number of bits necessary to individually address each of the sets of edge defining gain control values is generated, and are provided over line 29 to the second number generator 28. These address bits are added to the addressing signals formed from the reference synchronizing signals provided to the second number generator 28. The combined address has a plurality of bits that select the proper set of edge shape defining digital gain control values and another plurality of bits which select which particular gain control value is to be output on any particular clock cycle. These same system phase addressing control bits are employed to effect a change in timing of the operation of the logic contained in the first digital number generator 26 so that the digital amplitude peak values provided by that generator are properly phased to the transition edge values when sync to subcarrier phase is changed. Since the peak values do not change for the various phases of the synchronizing signals, changing the timing of the operation of the logic of the first digital signal generator can be accomplished without undue complexity.

As previously described, the two separately generated components are combined to form the synchronizing signal that is inserted in the video information. In the preferred embodiment illustrated in FIG. 1, this combining is effected by first combining the amplitude peak values provided by the first digital number generator with the video information signal at the multiplexor 22, as previously described. After combining the amplitude peak values with the video information signal, the result is coupled from the output terminal of the multiplexer 22 by bus 40 to the A input of the digital multiplier 20. The digital multiplier 20 is employed by the preferred embodiment to perform two functions. Of importance to the present invention, one of the functions is the combining of the transition edge values provided by the second digital number generator 28 with the amplitude peak values already inserted into the video information signal. This combining is achieved by digitally multiplying the amplitude peak values by the transition edge values provided over bus 42 by the second digital number generator 28 to the second B input of the multiplier 20. Therefore, the transition edge values are supplied as gain control values representing gain ratio numbers normalized to unity. The other function performed is the control of the video information signal gain, which is determined by the video gain control signal provided on a bus 42A extending from an operator controlled device (not shown). Because both functions required the same kind of operation to be performed on the signals, a single digital multiplier 20 can be employed, thereby simplifying the construction of the device 10.

However, the setting of the gain of teh video signal and the combining of the two digital value components forming the synchronizing signals can be performed separately. In such embodiments, two multipliers are employed. One is located in the video information signal path between the output of the video signal generator 24 and the input to the multiplexer 22. The video gain bus 42A extends to this multiplier to couple to it the video gain control signal that determines the video signal gain. The other multiplier is located in the signal path between the output of the first digital number generator 26 and the input to the multiplexer 22. In addition to the digital signal values defining the peak amplitudes of the synchronizing signals to be generated, this multiplier also receives the transition edge determining digital gain control values provided by the second digital number generator 28. These two streams of digital data are multiplied together, and the resulting stream of data is input to one channel of the multiplexer to be switched into the stream of video information data at the appropriate times.

Another embodiment is as described just previously but eliminating the second multiplier performing digital gain control and using only one multiplier to synthesize the synchronizing signals. The gain control function can be performed after the digital steam of data defining the composite television signal is reconverted to analog form.

In either of these multiplexor embodiments, the two number generators 26 and 28 are operated synchronously under the control of reference synchronizing signals provided by the reference synchronizing signal generator 27, as previously described. As will be described in further detail hereinafter, these reference synchronizing signals are processed by the addressing circuitry and decoding logic associated with the two number generators 26 and 28 so that the amplitude peak values and the transition edge gain control values are issued by the generators at the appropriate times relative to each other and for the appropriate durations to effect the formation of the various desired synchronizing signals at the proper times relative to the video information signal with which they are combined.

For applications where analog forms of television signals are required by a utilization device, a digital to analog converter 39 has its input coupled by a bus 51 to receive the multi-bit binary words forming the composite digital television provided at the C output terminal of the multiplexer 20. The converter 39 converts the multi-bit digital signals provided at its input to a serial stream of discrete amplitude values issued at its output at a rate determined by the reference 4Fsc clock signal provided by the reference synchronizing signal generator 27 over line 36. A following low pass filter 41 has its input coupled by a line 53 to receive the serial stream of discrete analog amplitude values to form therefrom a continuous composite analog television signal for delivery from its output 55 to an analog type television signal utilization device. As previously described, a single, low pass filter is used, with the filter selected to have an upper corner frequency of a little less than two times the color subcarrier frequency and an upper stop band that rolls off to at least −6 decibels (dB) at a frequency of two times the color subcarrier frequency and to at least −55 dB at a frequency of three times the color subcarrier frequency. For NTSC color television signals, the color subcarrier frequency is approximately 3.58 MHz. The filter smoothes the series of discrete amplitude values provided by the A/D converter 39 to form the desired continuous composite along television signal.

Figure 2:
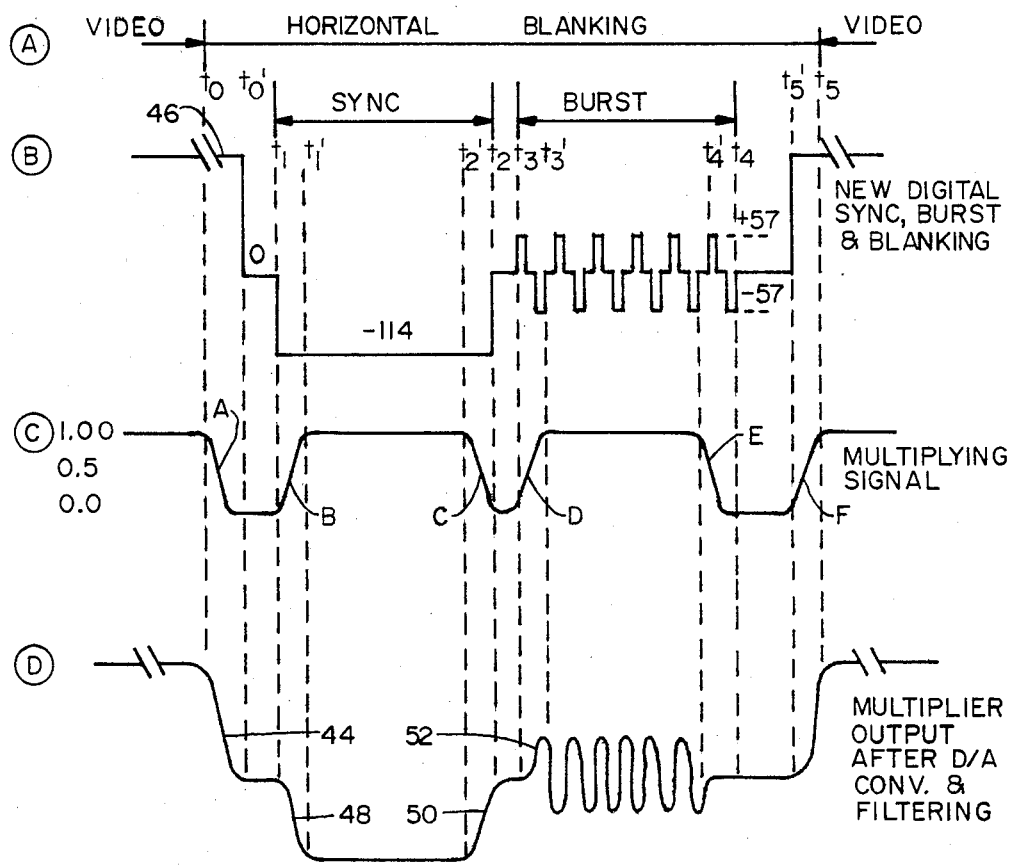
FIG. 2 is a timing diagram representing the signals which are multiplied to form the synchronizing signals for inserting in television signals in accordance with a preferred embodiment of the present invention.

A better understanding of the operation of the preferred embodiment will be had by referring to FIG. 2, which illustrates the timing relationships between the incoming video information signal, the digital signal values provided by the first digital number generator 26 and the digital transition edge gain control values from the second digital number generator 28 and the final analog composite synchronizing signal present at the output of the low pass filter 41 during the horizontal blanking interval. FIG. 28 illustrates the relative placement of the horizontal blanking interval, the horizontal sync interval, and the interval of the plurality of color burst cycles within the video information signal. The signal before time $t_0$ is video information. The horizontal blanking interval begins at the time $t_0$ and extends to the time $t_5$. Signals after the time $t_5$ are video information. The time between the times $t_1$ and $t_2$ in the horizontal blanking interval is the duration of the horizontal sync pulse. Following the horizontal sync pulse from time $t_3$ to time $t_4$ is the color burst synchronizing signal interval.

FIG. 2B illustrates in analog format the digital signal values output from the first digital number generator 26. Although the digital signal values are actually represented by a plurality of bits in either the logic one or the logic zero state on the output lines of the first digital number generator 26, it is convenient for purposes of illustration and clarity to represent these digital numbers by their analog values if they were converted to decimal system number. In the preferred embodiment, the analog value is represented by a 9 bit digital signal, with the analog value for the digital signal value representing the amplitude peak of the blanking levels chosen to be $0_{10}$. The analog value for the digital signal value representign the amplitude peaks of the horizontal sync signal, of the equalizer pulses, and the amplitudes of the intervals between the serrations in the vertical sync interval is chosen to be $-114_{10}$. The analog signal values chosen for the digital signal values representing the amplitude peaks of the color burst synchronizing signal are $+57_{10}$ and $-57_{10}$.

It is known that the vertical blanking interval synchronization signals have peak amplitudes which are the same as the horizontal blanking interval synchronization signals. The vertical blanking interval in the NTSC standard is comprised of pre-equalizing signals, a serrated vertical sync signal interval, post-equalizing signals and several composite horizontal blanking and sync interval synchronization signals. The peak amplitude of the pre and post equalizing signals and the peak amplitude of the intervals between the serrations in the vertical sync signal are the same as the peak amplitude of the horizontal pulses. The peak amplitudes of the color burst synchronizing signals in the vertical blanking interval following the post equalizing pulses are the same as their counterparts which occur during the horizontal blanking interval preceding lines of video information. Thus, one set of digital signal values can be used to represent the peak amplitudes of the synchronizing signals in both the horizontal blanking interval and the vertical blanking interval. Also, for any particular television standard, the edge shapes for the transition edges of all synchronization signals in both the horizontal and vertical blanking intervals is the same so the same set of digital transition edge gain control values can be used to form all the edges of all synchronizing signals in either interval (for a given sync to subcarrier phase--for a different sync to subcarrier phase, a different set of gain control values is used, but this same set is used to form all the edges for all the synchronizing signals in both the horizontal and the vertical blanking intervals).

FIG. 2C illustrates, in analog format, the relative timing of the output from the second digital number generator 28 of the digital transition edge gain control values representing the desired shape of th e edges to be formed on the digitally synthesized synchronization signals in both the horizontal and the vertical blanking intervals. As in the case of FIG. 2B, the digital transition edge gain control values are digital numbers each represented by a plurality of bits in either a logic one or a logic zero state on one of the output lines of the second digital number generator. These digital gain control values are output sequentially and would have analog values if converted to analog format that, if plotted, would represent the shape of a $(\sin(x))^2$ curve. These analog values vary between $0_{10}$ and $1_{10}$ and stay at their last value until the next edge transition comes along. The edges A-F are all sine squared edges in the preferred embodiment because such is the edge shape specified in the NTSC standard. However, in other embodiments, digital values representing different shapes could be generated by the second digital number generator. The edges A and F mark the commencement and conclusion respectively of the horizontal blanking interval, edges B and C mark the beginning and end of the horizontal sync pulse, and edges D and E mark the beginning and end of the color burst interval.

The waveform of FIG. 2D illustrates the output waveform from the multiplier 20 after the multiplication of the digital signal values and the digital edge transition gain control values and after the resulting digital products have been converted to a stream of discrete analog signal values by the D/A converter 39 and filtered to smooth out the signal by the filter 41.

As seen in FIG. 2, the digital signal values assume their peak amplitude values at times relative to the times when the digital edge transition gain control values are presented to the multiplier 20 such that the proper edge shapes can be formed. For example, the edge 44 is formed by causing the output of the first digital number generator 26 to make the transition to the digital number representing the horizontal blanking level at the time $t_0$, which is a time shortly after the time $t_0$ when the digital transition edge gain control value set defining the shape of the edge A begin to appear at the B input of the multiplier 20 in making a transition from $1_{10}$ to $0_{10}$ in a series of discrete steps. If this sequence of events were reversed or otherwise altered, the edge 44 in FIG. 2D might not be properly formed. The same is true of edge 48 in FIG. 2D. Note how in FIG. 2B, the output of the first digital number generator assumes the value of the horizontal sync pulse peak amplitude at a time $t_1$ which is the same time when the output of the second digital number generator starts to output a sequence of digital transition edge gain control values which make a transition from $0_{10}$ to $1_{10}$ in a sequence of discrete steps ending at time $t_1$, such that the edge 48 is formed in the proper shape. Study of the timing of the appearance of the digital signal values represented by FIG. 2B and the appearance of the digital transition edge gain control values represented by FIG. 2C show that a similar situation exists for each of the edges C, D, E and F. Of course, it is possible to generate the waveform of FIG. 2B according to a function other than as described, which when multiplied by the gain values representing a function other than the sine squared function shown in FIG. 2C, will result in the waveform of FIG. 2D. However, for a digital embodiment, the waveforms of FIGS. 2B and 2C are the simplest to implement.

As will be apparent from the discussion above, the edge 44 in FIG. 2D starts downward when the edge A starts downward, i.e., when the output of the second digital number generator begins to present its sequence of digital gain control values which have values decreasing in a sine squared manner. Thus, the shape of the edge 44 is formed by the shape of the edge A. The advantage of generating the desired shape for the edge 44 and all the other edges in this manner is that the exact timing of the start and end of the edge, its shape and its passage through the 50% amplitude point can be precisely controlled. This is an important advantage for the formation of the transition edge 48 in FIG. 2D, which is the leading edge of horizontal sync. Precise control of the timing and shape of this edge is important in being able to control the sync to subcarrier phase. Precise control of the timing and shape of the edges 50 and 52 is also important as they represent, respectively, the end of horizontal sync and the beginning of the burst interval.

Figure 3:
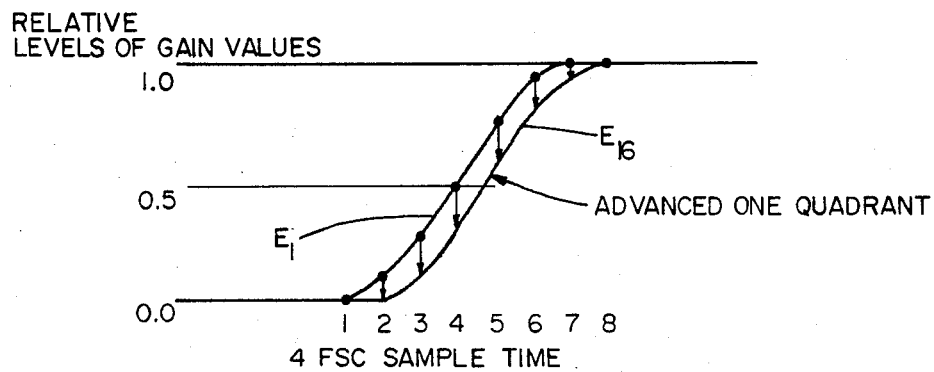
FIG. 3 is a diagram of the 8 samples forming the digital gain control values which are stored in a programmable read only memory (PROM) to shape the signal transition edges of the television synchronizing signals.

Referring to FIG. 3, there is shown a more detailed view of the discrete values for the digital gain control values, in analog format, which make up each sine squared edge A through F in FIG>2C. There are 16 sets of digital gain control values which define 16 sine squared edges. The edges $E_1$ and $E_{16}$ represent only the 1st and 16th such edges. The other edges lie somewhere between these two extremes, but all edges have the sine square shape. Each edge is defined by 8 discrete sample values, one of which is output for every clock cycle of the 4Fsc clock signal as indicated by the 8 clock times marked below the curves. The value for any discrete one of any of the sets of transition gain control values for any particular one of the 8 clock times is given by the intersection of a vertical line extending up from the clock time of interest and the selected sine squared edge of interest. It will be apparent that the 50% amplitude point of each particular one of the 16 sets of sine squared edges occurs at a different time relative to the 4 Fsc time line. As will be explained in more detail below, the provision of several families of edge defining gain control values, it is possible to adjust the sync to subcarrier phase to accomodate different television standards and desired shifts in the sync to subcarrier phase for any given television standard.

As will be seen from the discussion of FIG. 5, there is a provision in a preferred embodiment of the invention for allowing the horizontal sync to subcarrier phase to be adjusted by the user in both a coarse and fine tuning fashion. This allows the user to input a signal which causes the horizontal sync envelope, represented by the edges B and C in FIG. 2C, to be moved over a range of one full 360 degree cycle of the subcarrier. The provision of different families of gain control values provides the fine tuning facility for this function.

The same mechanism which allows adjustment of the sync to subcarrier phase also doubles as a mechanism through which a 25 hertz offset may be inserted to satisfy the PAL standard for video equipment. Both the 25 hertz offset and the variation of the sync to subcarrier phase are implemented by shifting the temporal positions of the sync and blanking synchronization signals with respect to the temporal position of the zero crossings of the color burst synchronizing signal in the horizontal blanking interval. This process is accomplished in the coarse tuning aspect by altering the timing of the generation of the addressing signals for the PROM that stores the digital edge transition gain control values. In the fine tuning aspect, further adjustments are accomplished by selecting a different one of the families of edge defining gain control values to access from the PROM.

In FIG. 3 the edge $E_{16}$ is advanced by one quadrant, i.e., by one quarter of a cycle of subcarrier from the temporal position of the edge $E_1$. Note that in the first set defining the edge $E_1$, the gain control value accessed at the sample 8 time is a repeat of the gain control value accessed at sample 7 time. Note also that in the 16th set of gain control values, $E_{16}$, the gain control values accessed at sample times 7 and 8 have unique values but the gain control values accessed at sample times 1 and 2 are repeats of each other.

The relative level of each of the sample points is established at a level which results in the formation of the desired edge shape and which will meet the rise time requirements of the NTSC standard. Clearly, the invention provides a very flexible way of forming any desired pulse shape with practically any rise time without the use of expensive and complicated filters.

The video signal processor 24, in embodiments where the incoming video information is in digital form, serves to convert the incoming digital samples defining the video information signal to two's complement format and to shift the digital representation of the video information such that the blanking level of the incoming video information signal is $zero_{10}$. The video signal processor also adds a sign bit such that increasing luminance signals are positive 2's complement numbers and sync signals are negative 2's complement numbers. This process amounts to conversion of the incoming data to a 2's complement number by subtracting the blanking level (128 in a 9 bit video system having level 512 as the maximum luminance value and sync tip at level 14) from the incoming video such that the blanking level is at the zero level and adding a sign bit of zero for positive levels and one for negative levels. The exact logic to do this is described in more detail below.

FIG. 4A and 4B show a timing diagram for the address signals generated by the logic for addressing the PROM in the envelope generator 28 to effect generation of the digital values representing the synchronizing signals during the horizontal blanking interval. The timing relationships associated with the generation of the digital value representative of the synchronizing signals that occur during the vertical synchronizing interval are similarly generated as will be described in further detail hereinafter with reference to the timing PROM 100 shown on FIG. 5B. These figures also give the boolean expressions which are true for any particular interval of time marked off by a box defined by the dashed horizontal and vertical lines shown in the figures. Each signal is assigned a time line which is circled and on the left of the signal. The signal on line 1 indicates the timing of the desired sine squared edges where the edges are marked with the same reference letters as they were marked with in FIG. 2C. This representation on time line 1 is of course not a real signal, but is, instead, the graphical representation of the times of occurrence and the analog voltage levels of the digital transition edge gain control values if they were converted to a series of discrete analog voltage levels and filtered to smooth out the transitions between these levels.

The meaning and use of the other signals on the time lines 2–15 in FIGS. 4A and 4B will be better understood by referring to FIGS. 5A–5E which together illustrate a diagram of the logic which implements the preferred embodiment of the invention depicted in FIG. 1. The reader is urged to assemble the drawings 5A–5E using the cut lines shown thereon and signal names to match the signals leaving one of the drawings and going to another for ease of understanding. The portions of the logic which correspond to the functional blocks of FIG. 1 will be discussed in order so that the particular circuits which comprise each functional block may be identified. The manufacturers part number for each integrated circuit in indicated alongside each integrated circuit in abbreviated form which will be apparent to those skilled in the art.

Figure 5A:
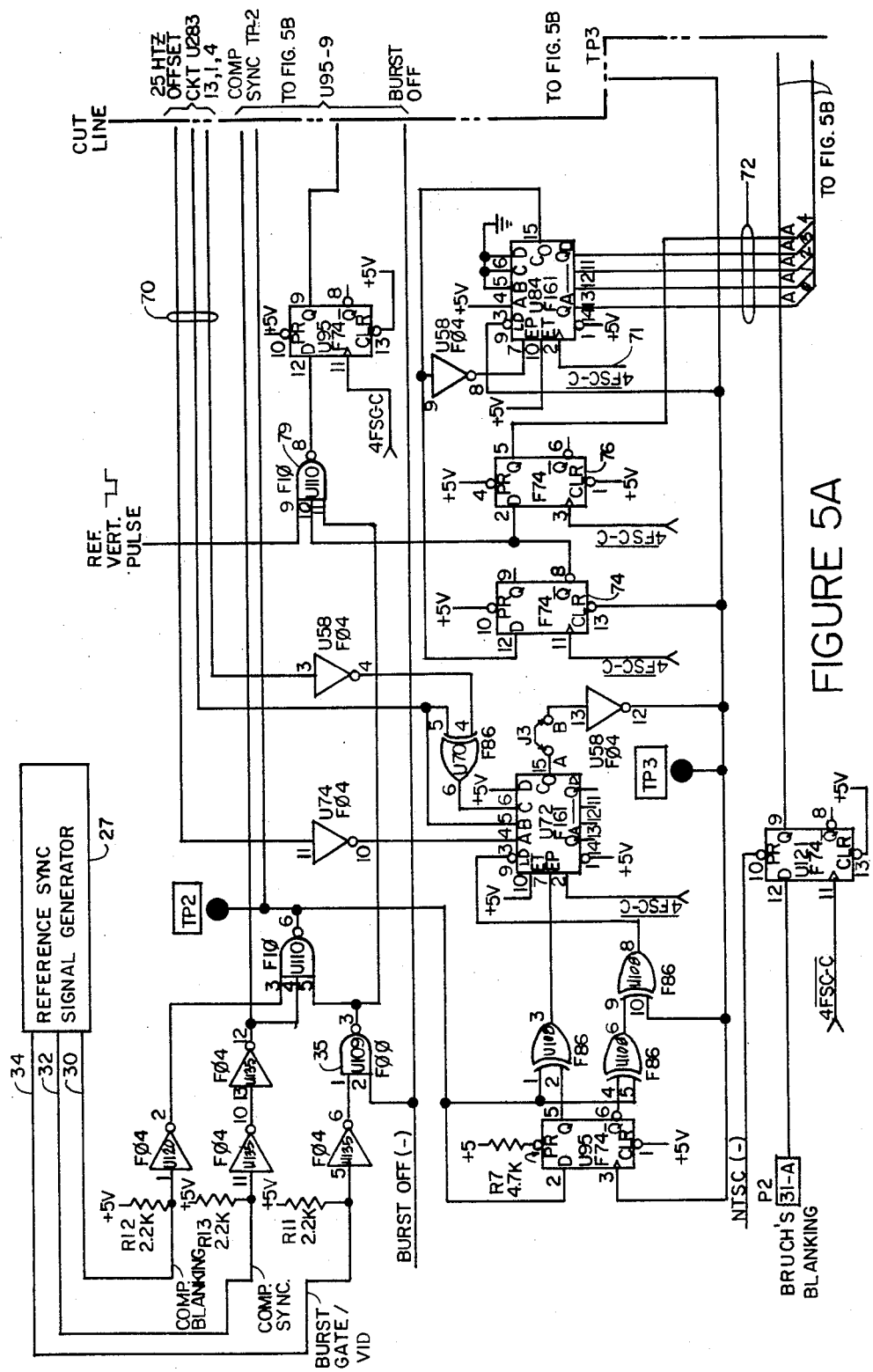
Figure 5B:
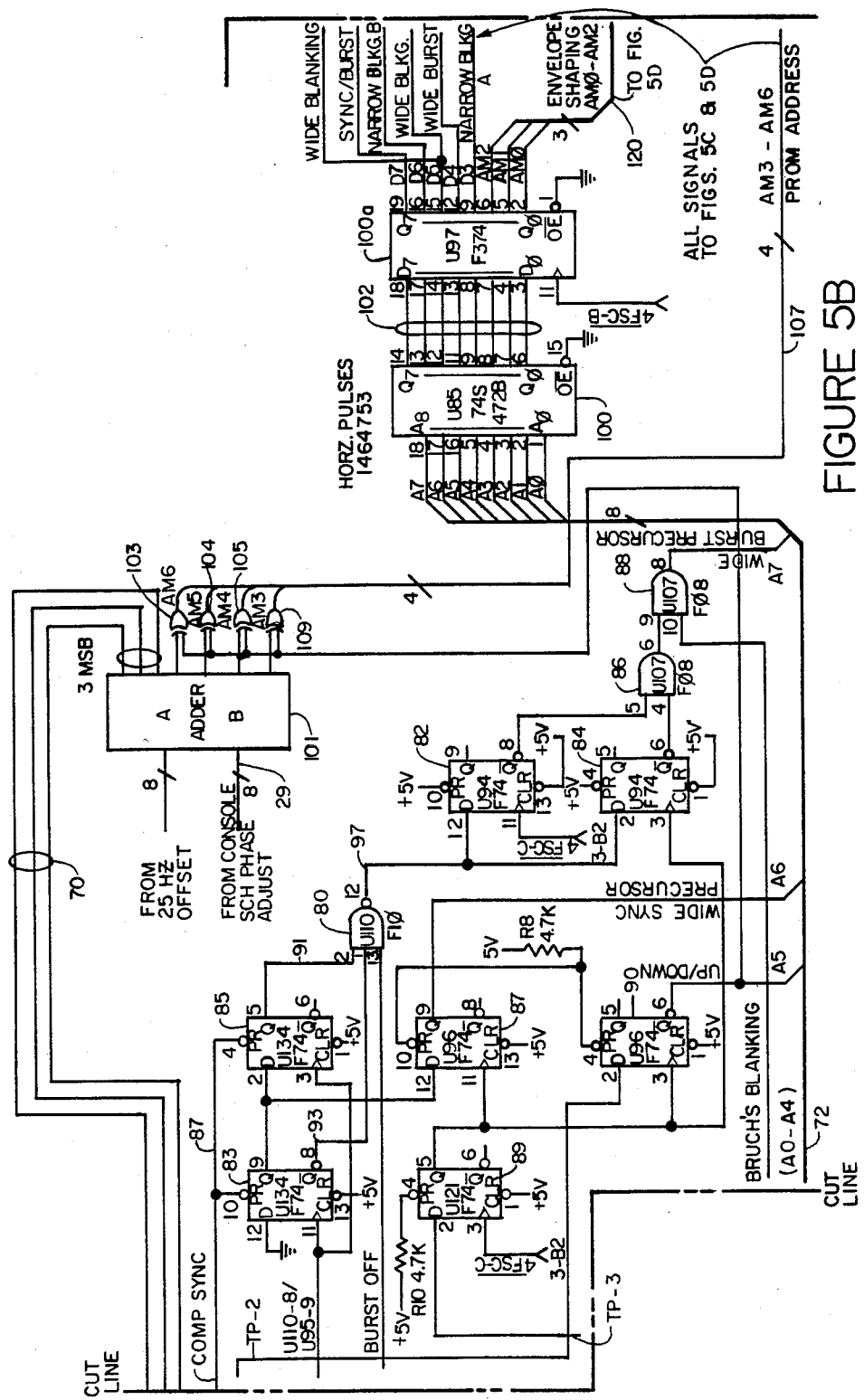

Referring to FIGS. 5A and 5B there is shown logic which is shared by the first digital number generator 26 and the second digital number generator 28. The input signals COMP BLANKING, COMP SYNC, and BURST GATE are the signals on the lines 30, 32 and 34 from the reference sync signal generator 27. The structure of the reference sync signal generator is well known to those skilled in the art, and integrated circuits are commercially available to perform this function. The timing of these three signals is indicated in FIG. 6 along with the relationships these signals have with the signals at test points TP-2 and TP-3. Basically, the signals COMP BLANKING, COMP SYNC and BURST GATE generated by the reference sync signal generator 27 indicate the times of occurrence and the duration of all the synchronization signals in the composite video signal for both the horizontal and vertical blanking intervals. The edges of these signals are used to signal the start of the process of retrieving the digital transition edge gain control values that define the sine squared edges for the synchronization signals being digitally synthesized. Each of the signals from the reference sync signal generator 27 indicates the starting time and the duration of a particular one of the synchronizing signals in the composite video signal. That is, the COMP BLANKING signal on line 30 indicates by its transitions 51 and 53 and the starting time and duration of the horizontal blanking interval. Similar transitions not shown in FIG. 6 indicate the starting time and duration of the vertical blanking interval in the composite video signal. The COMP SYNC signal on line 32 indicates the start times and the durations of the horizontal and vertical sync signals, the equalization signals and the serrations in the vertical sync signal. The transition 54 and 56 in FIG. 6 indicate the beginning and end of the horizontal sync signal during the horizontal blanking interval. The BURST GATE signal on line 34 signals the starting times and the durations of the color burst intervals in the horizontal and vertical blanking intervals. The transitions 57 and 59 indicate the start and stop of the horizontal blanking interval color burst interval. Although the states of these references synchronizing signals from the reference sync signal generator 27 are shown only for the horizontal blanking interval in FIG. 6, there are also transitions in these signals during the vertical blanking interval. These transitions during the vertical blanking interval serve the same purpose as the transitions in these signals shown in FIG. 6 except that they provide reference timing for the vertical blanking interval synchronization signals instead of the horizontal blanking interval synchronization signals. These transitions during the vertical blanking interval control digital synthesis of the vertical blanking interval synchronizing signals in accordance with the specifications of the particular television standard which is being implemented. The peak amplitudes, pulse shapes and sequence of pulses in the vertical blanking interval are well known to those skilled in the art and are published in the various television standards.

These reference synchronizing signals are buffered by gates U120 and U135 and are combined by the NAND gate U110 to generate the TP-2 waveform of FIG. 6. All the signals must be ANDed to get the TP-2 waveform, and the gate U110 performs this function. Note that the pulses of the TP-2 waveform have an edge at the time when each sine squared edge is to be formed. The purpose of the TP-2 signal is to signal the times when the sine squared edges are to be formed. The TP-2 signal also starts the process of addressing the PROM to access the gain control values needed to form these edges. The TP-2 signal also starts the chain of events which cause the proper signals to be generated to control the first digital signal generator to cause it to generate the appropriate digital signal values to represent the particular peak amplitude value needed at any particular time for multiplication by the gain control values. Mainly, the TP-2 waveform marks the time of each transition between the video information and the synchronizing signals and the transitions between the various ones of the synchronizing signals. For example, the transition 58 marks the boundary between video information signal and the start of the horizontal blanking interval. The transition 60 marks the transition in the horizontal blanking interval of the synchronizing signals from the horizontal blanking level to the horizontal sync level. The transition 62 marks the trailing edge of the horizontal sync signal when the voltage level of the final composite video signal is supposed to return to the horizontal blanking level from the peak amplitude level of the horizontal sync signal. The transition 64 marks the beginning of the color burst interval while the transition 66 marks the end of the color burst interval. The transition 68 marks the end of the horizontal blanking interval.

A NAND gate 35 having one input coupled to a BURST OFF signal serves to prevent the passage of the BURST GATE signal through to the gate U110 under processing conditions when no burst is present, such as processing monochrome signals. The reference sync signal generator 27 continues to generate the BURST GATE signal even when monochrome signals are being processed. The BURST OFF signal is a command from the user console which is active low, and which causes the gate 35 to block the passage of the BURST GATE signal through to the gate U110 thereby preventing the formation of transitions 64 and 66 in the TP-2 signal.

Each of the existing transitions on the TP-2 signal is converted to one of the pulses on the TP-3 signal illustrated on the time line 5 of FIG. 6 by an edge detector circuit comprised of the IC's U95, U108, and U72. The operation of this edge detector will be apparent to those skilled in the art, and any edge detector design will suffice for purposes of practicing the invention. The purpose of the edge detector is to generate a pulse for each transition in the TP-2 signal. The IC U72 is a Fairchild 74F161 synchronous presettable modulo 16 binary counter which counts the 4Fsc clock pulses (period 70 nanoseconds) when the signal at pin 7 enables the counting. The preset inputs of this counter are couped to the sync to subcarrier phase adjustment circuit 101 (FIG. 5B) and a 25 hertz offset circuit by a bus 70. The data on the bus 70 preloads the terminal count into the counter U72. When the count reaches this count, the terminal count output, pin 15 goes high, which by the action of the inverter U58 causes the node TP-3 to go low for one clock cycle. By changing the count preloaded into the counter U72, the pulses on the TP-3 signal at the TP-3 node, shown at time line 5 of FIG. 6 can be shifted in time relative to the transitions in the TP-2 signal on time line 4. The addressing signals for accessing the edge shaping gain control values from the second digital signal generator are generated starting at the time when TP-3 goes low, as are the signals which control the operation of the first digital signal generator 26. By changing the time of the high to low transitions of TP-3 relative to the transitions of TP-2, it is possible to change the times when the addressing signals controlling the second digital signal generator 28 and other signals which control the first digital signal generator 26 occur. This is the facility by which the sync to subcarrier phase may be adjusted in coarse fashion one quadrant at a time. It is also the facility by which the generation of the signals which cause the first and second digital signal generators to present the appropriate digital values for multiplication at the appropriate times is coordinated and synchronized with the same clock signal. By properly presetting the count in the counter U72, the horizontal sync and horizontal blanking synchronization signals may be shifted relative to the zero crossings in color burst interval, as will be explained in more detail later. By presetting the count of U72 with the data on the bus 70, a course adjustment of the time of occurrence of the sine squared edges of the horizontal sync and horizontal synchronization signals relative to the time of occurrence of the color burst interval can be accomplished. Adjustment is by an integer number of 4Fsc cycles. Thus, other television standards may be accommodated and sync to subcarrier phase may be adjusted for any particular television standard with virtually no drift because of the digital and synchronous wayin which the adjustment is made.

The pulses of the TP-3 signal are used to signal when each sine square transition edge is to be formed. This is illustrated by the time line 2 in FIGS. 4A and 4B where the TP-3 pulses are shown as negative pulses one of which occurs just before each sine square transition edge in time line 1 occurs.

The signal on TP-3 is used to begin the process of addressing the PROM in the second digital number generator 28 used to store the digital transition edge gain control numbers such that the numbers defining the sine squared transition edges begin to appear on the output of the PROM. In order to accomplish this PROM access function, the proper address signals to access the PROM must be generated. Note that the signal on TP-3 in FIG. 5A is coupled to the load input of another presettable, modulo 16 binary counter U84 which counts 4Fsc cycles starting from a fixed number hardwired to its preset inputs. This occurs each time a TP-3 pulse loads the preset count.

The signals A0–A7 on time lines 3–10 of FIGS. 4A and 4B (hereafter referred to as FIG. 4 unless specific reference to one half or the other is needed) represent the binary outputs of the counter U84 and serve as address signals for a timing pulse generation PROM 100 shown in FIG. 5B. The signal A0 is a divide by two count of the 4Fsc clock pulses on a line 71. The A1 signal is a binary division of the A0 signal by 2, and the A2 signal is a binary division of the A1 signal by two. Likewise for A3. The A4 signal is generated by the flip flops 74 and 76 which are coupled to the terminal count output of the couter U84 and to the 4Fsc clock so that when the count reaches 16, the signal A4 makes a high to low transition on the next 4Fsc clock transition following the terminal count.

Three more signals, A5, A6 and A7, are generated by the logic shown on FIG. 5B to serve as address signals for a timing signal generator in the form of the PROM 100, U85. The signal A5 is illustrated on the time line 8 of FIG. 4, and is low when the digital transition edge gain control values output by the second digital number generator 28 are supposed to be accessed in a sequence where gain control values in the sequence are increasing from $0_{10}$ to $1.0_{10}$. The signal A5 is high when the digital transition edge gain control values are supposed to be accessed in the reverse order such that the gain control values in the sequence are decreasing from $1.0_{10}$ to $0_{10}$. This is the portion of the logic circuitry referred to earlier which plays a part in controlling whether the sine squared edge being formed is a rising edge or a falling edge. The manner in which this is done will be explained in more detail below.

The signal A6 on time line 9 in FIG. 4 is called the WIDE SYNC signal, and it is in a logic one state starting from a time before the sine squared edge marking the start of the horizontal sync interval is to be formed. The A6 signal remains in the logic one state until a time after the sine squared trailing edge of the horizontal sync signal is to be formed. The purpose of the WIDE SYNC signal is to provide timing for the first digital signal number generator 26 in the form of a signal SYNC/BURST for which WIDE SYNC is a precursor. The SYNC/BURST signal indicates to the first digital signal number generator when the digital signal values defining the peak amplitude of the sync signals are to be presented to the multiplier and when the digital signal value defining the peak amplitudes of the burst signal is to be presented to the multiplier.

The signal A7, illustrated on time line 10 of FIG. 4, is called the WIDE BURST signal. It makes a transition to a logic one state starting at a time before the sine squared leading edge of the color burst synchronizing signal "envelope", i.e., the shape defined by the tips of the sine wave cycles of the color burst synchronizing signal, is to be formed. The A7 signal remains in the logic one state until a time after the sine squared trailing edge of the color burst envelope is to be formed. The WIDE BURST signal indicates to the second digital signal number generator 28 when the burst interval is occurring, and is used with another signal 625/525 shown on FIG. 5D as an address bit for the PROM that stores the gain control values defining the edge shapes for the synchronizing signals in both the horizontal and vertical blanking intervals. Together, the WIDE BURST and 625/525 signals define which standard the system is operating under, and cause selection of an appropriate family of gain control values to satisfy the edge shape and rise time requirements of that particular standard. For example, the SECAM standard does not use burst at all, and the PAL standards require a different synchronizing signal rise time than the NTSC standards.

The particular preload number to the counter U72 and the particular one of the 16 families of gain control bits selected is controlled by input signals from a 25 hertz offset circuit and input signals from a control on the user console which indicates the desired amount of sync to subcarrier phase. These input signals in digital format are added in an adder 101 on FIG. 5B, and the 3 most significant bits of the result are coupled by the bus 70 to the preset inputs of the counter U72 of FIG. 5A. These three bits select the desired quadrant of coarse sync to subcarrier phase adjustment desired. There are four possible quadrants representing one full subcarrier cycle worth of phase change which may be selected. The fine tuning of sync to subcarrier phase is accomplished in response to an SCH phase a dust control signal provided on line 29 through an appropriate operator phase selection device (not shown). The 4 least significant bits marked AM3 through AM6 of the result from the adder 101 effects the selection of the particular one of the 16 possible families of edge defining gain control values within the selected quadrant. These 4 bits are coupled through exclusive-or gates 103 through 106 and a bus 107 to 4 of the address inputs of the PROM in the second digital signal generator 28, which stores the gain control values to define the edge shapes for the sync and burst synchronizing signals. The address bit A5 is coupled as another input to the exclusive-or gates 103 through 106. When A5 is a logic zero, the result bits AM3 through AM6 pass through the gates without change. When A5 is a logic one, the result bits AM3 through AM6 pass through the gate and are all inverted. This aids selection of the gain control bits defining the appropriate edge direction.

The PROM 100 responds to the address signals A0–A7 present at its address inputs by issuing timing signals over lines 102 extending to a latch 100a. This latch 100a reclocks the timing signals for use by other circuitry of the system, including AM3–AM7 that determine the time periods within which the various sync and blanking intervals occur and AM0–AM2 which signify the time and direction for generation of edge shapes. The manner in which the levels and edge shapes are generated in response to these timing signals will be described in further detail hereinafter.

Before the generation of the signals A5 through A7 can be discussed, the operation of the NAND gate 79 must be discussed. The NAND gate 79 has three inputs, a signal on pin 10 related to the TP-3 signal, a signal on pin 11 related to the BURST GATE anded with the BURST OFF signal and a REF VERT PULSE signal. The REF VERT PULSE signal is low at the leading edge of vertical sync during the vertical blanking interval and stays low for the rest of the vertical blanking interval. The purpose of the NAND gate 79 is to affect the generation of the A6 and A7 address signals such that digitally synthesized burst synchronizing signals are not generated when they are not desired, such as when monochrome signals are being processed.

The timing diagram of FIG. 7 shows the signal states of the various signals at the inputs and outputs of the gate 79 under various conditions. The signals on time lines 1 and 2 are the TP-2 and TP-3 signals already discussed. These signals serve as reference points for purposes of study of the rest of FIG. 7 to put the signals shown there in context of the overall operation of the system. The signal on input pin 10 of gate 79 is shown on time line 3. This signal, which is the Q not output of flip flop 74, is set to logic one upon the occurrence of each TP-3 pulse, with one exception, because the TP-3 pulses are coupled to the clear input of the flip flop 74.

The exception to this rule occurs during times when the BURST GATE signal, shown on time line 5 of FIG. 7, from the reference sync signal generator 27 is in a logic one state (the BURST GATE signal on time line 5 has been inverted by an inverter U135). The BURST GATE signal will be allowed to reach the gate U110 on FIG. 5A only when a color television signal is being processed by the system. For purposes of discussion, when BURST OFF is active, BURST GATE will be said to be not present and vice versa when BURST OFF is not active. In the case of monochrome signals, no BURST GATE signal will be present. The signal on time line 4 of FIG. 7 shows the U110 input signal on pin 10 during times when there is no BURST GATE signal present. This is the state of the signal for pin 10 of U110 when monochrome signals are being processed. The input signal on pin 11 of gate U110 is the inverted BURST GATE signal on the line 34 from the reference sync signal generator 27 after it is buffered and inverted by inverter U135 and gated by the BURST OFF signal in the gate U109. Suffice it to say that if the BURST GATE signal is shut off, the sine squared "envelope" will have a value corresponding to zero, hence, no transition edges will be generated during the interval when color burst would occur in a color television signal. The remaining input to the NAND gate 79 is the REF VERT. PULSE on line 81. This signal acts as described earlier and serves to inhibit the burst related address signals for the PROM 100 during the vertical interval. The output signal from the gate U110, pin 8 is illustrated on the time line 6 of FIG. 7 when the BURST GATE signal is present during color signal processing and on time line 7 of FIG. 7 when the BURST GATE signal is not present during monochrome signal processing. This signal is coupled to the D input of a reclocking flip flop U95 which is clocked by the 4Fsc reference clock thereby synchronizing the output transitions of the gate U110 to the 4Fsc reference clock.

The Q output of the reclocking flip flop U95, pin 9, is coupled to clock inputs of two D flip flops 83 and 85 of U134. The operation of U134 and a NAND gate 80 in U110 is illustrated in the timing diagram of FIG. 8. The COMP SYNC signal on line 87, illustrated on time line 4 of FIG. 8, is coupled to the asynchronous direct set inputs of the flip flops 83 and 85 to set both their Q outputs to logic one on pins 9 and 5 at the time of the high to low transition 54 of COMP SYNC. The clock inputs of the flip flops 83 and 85 receive the reclocked output signal from gate U110, pin 8. The logic states of this signal are shown on either time line 2 or 3 of FIG. 8, depending upon whether the BURST GATE signal is or is not present. Since the D input of the flip flop 83 is grounded, any upward transition of the clock input at pin 8 of NAND gate 79 sets the Q output, pin 9, at logic zero, except when the present input is held at a logic zero. Thus, when the COMP SYNC signal on time line 4 sets the Q output of flip flop 83, it remains set until COMP SYNC goes low at the end of the horizontal sync interval a low to high transition 282 or 284 occurs at pin 8 of NAND gate 79 goes high, as shown on time line 2 or 3, depending upon whether color or monochrome signals are being processed. This causes a transition 286 on the Q output of the flip flop 83, which marks the end of the "wide sync" period. It is irrelevant whether color or monochrome signals are being processed since the sync signal interval is the same in either case. the transition 286 on time line 5 occurs after the end of the horizontal sync interval marked by the transition 156 on the COMP SYNC signal, and must be reclocked with the TP-3 signal and the 4Fsc clock signal. For this purpose, it is coupled to a flip flop 87 which has its D input coupled to the Q output of a flip flop 89 which has its D input coupled to the TP-3 node and its clock input coupled to the 4Fsc clock. The flip flop 87 is clocked by the 4Fsc signal, and generates the signal A6 shown on time line 9 of FIG. 4 at its Q output. This signal is a precursor to the WIDE SYNC signal.

Continuing with FIG. 8, the Q output signal from flip flop 83, time line 5, is also coupled to the D input of the flip flop 85. The Q output on pin 5 of the flip flop 85, was set to logic one by the transition 154 of the COMP SYNC signal. The Q output of flip flop 85 will be reset to logic zero after the high to low transition 286 in the wide sync precursor signal from the Q output of the flip flop 83 upon the occurrence of a certain condition. That condition occurs at the time of the next low to high transition at the clock input of the flip flop 85. The clock input of the flip flop 85 is coupled to the output of the NAND gate 79/flip flop U95, so the next low to high transition will be either the transition 288 or 290 on time lines 2 or 3 depending upon whether the BURST GATE signal is or is not present, i.e., whether color or monochrome signals are being processed. The resultant output signal transitions at the Q output of U134 are illustrated at 292 and 294 of time lines 6 or 7 in FIG. 8 for, respectively, the BURST GATE present and BURST GATE not present conditions. This signal at the Q output of the flip flop 85 on line 91 is a precursor signal for the WIDE BURST signal, A7 on time line 10 of FIG. 4 in that it defines the duration of the WIDE SYNC signal although not its starting time. The starting time of the WIDE BURST signal is established by reclocking the precursor signal with the 4Fsc clock and the TP-3 signal and gating the result with a signal called BRUCH'S BLANKING to be described below.

The Q output of flip flop 85 on line 91 is gated through a NAND gate 80. The NAND gate 80 gates the signal with the BURST OFF signal and the Q not output of the flip flop 83 on line 93 to generate the signal on time line 8 of FIG. 8. The BURST OFF signal is a logic one when color signals are being processed, so it does not block passage of the signal on the line 91 during color processing, but will block passage of this signal through the gate 80 during times when BURST OFF is a logic zero indicating monochrome processing or other conditions where no digital synthesis of a burst signal is desired. Time line 8 does not indicate the condition where BURST OFF prevents the passage of the signal on line 91 through the gate 80. Since the Q not output of the flip flop 83 on line 93 makes transitions opposite those at the Q output of the flip flop 83, the transition 286 on time line 5 will cause the output of the gate 80 to make the transition 295 on time line 8, because the signal on line 91 is a logic one at this time. The high to low transition 292 of the signal on line 91 during color processing will cause the low to high transition 252 on time line 8 of FIG. 8. The time line 8 signal at the output of the gate 97 is another precursor signal for the WIDE BURST signal, A7. All that remains to complete the generation of the WIDE BURST signal is to reclock the signal on line 97 with the TP-3 and 4Fsc signals and to gate it with another signal, BRUCH'S BLANKING. To do this, the signal on line 97 is reclocked with the 4Fsc signal and the TP-3 signal by flip flps 82 and 84 and gated with the BRUCH'S BLANKING signal in the gate 88 to generate the A7 address signal. The address signal A7 is only a precursor of the WIDE BURST signal shown on time line 10 of FIG. 4. The actual WIDE BURST signal is generated by the PROM 100 by decoding the address signals A0 through A7 to generate the output bit D4 shown on time line 10 of FIG. 4. The BRUCH'S BLANKING signal is only active during PAL signal processing. In PAL processing during the vertical blanking interval there is one horizontal line interval in each vertical blanking interval which does not have any burst synchronizing signal. The time of occurrence of each such horizontal line interval varies in each field of each frame in a cyclical fashion called Bruch's sequence. The BRUCH'S BLANKING signal prevents the burst synchronizing signal from being digitally synthesized for these horizontal line intervals in the vertical blanking intervals where no burst is supposed to be present when processing PAL signals.

The operation of the flip flops 82 and 84 is illustrated in the timing diagram of FIG. 9. Time line 3 illustrates the D input signal at pin 12 of flip flop 82 which is coupled to the output pin 12 of the gate 80. This signal is clocked by the 4Fsc clock to cause the Q not output on pin 8 to make the transitions 96 and 98 on the time line 4 which represents the reclocked output of the gate 80. The Q not output of the flip flop 84, pin 6, is illustrated on time line 5. This signal represents the output of th gate 80 reclocked with the TP-3 signal at pin 3 from the Q output of the flip flop U121. The signals on the time lines 4 and 5 are then ANDed by the gate 86 to result in another precursor to the A7 WIDE BURST signal on pin 6 of gate 86.

The A5 address signal, as noted earlier, plays a part in controlling the order in which the digital transition edge gain control values are accessed from the PROM in the second digital number generator 28. the PROM 100 decodes the address signals A0 through A7 and generates output bits D0 through D7 according to a truth table which can be derived from FIG. 4. The output bits D3 through D7 are the signals on the the output lines marked D3 through D7 from the latch U97. THe D0 through D2 output bits are the envelope shaping address bits AM0 through AM2 on the bus 120 coupled to the address port of a pair of PROMs U99 and 111 on FIG. 5D. The state of these address bits AM0 through AM2 is indicated as the state of the three bits D0 through D2 on time line 1A of FIG. 4. During the edge A formation, time line 1, the three bits D0 through D2 decode the address bits A0 through A7 in the sequence 7, 6, 5, ... 0. During the edge B, the address bits A0 through A7 define B addresses during the 8 clock cycles of the edge formation which are different from the 8 addresses defined by A0-A7 during the formation of edge A. The contents of the eight addresses accessed during the formation of the edge B define 8 bit patterns for the bits D0 through D2 which are the addresses provided to the pair of PROMs U99 and 111 for the 8 sample points for the sine squared edge gain control values of a sine squared edge accessed in the sequence 0, 1, 2, ... 7. The sequences for all the other edges are as indicated on time line 1A in FIG. 4.

The A5 signal aids in the process of changing the order of access of the gain control values by inverting the bits which select the particular one of the 16 families of curves selected by the address bits AM3 through AM6 provided on the address bus 120 by the adder 101 (FIG. 5B). The reason for this can be seen from inspection of FIGS. 2 and 3. If the address bits AM3-AM6 select the edge $E_1$, inverting the AM3-AM6 bits results in the selection of the edge $E_{16}$. The reason this is necessary is best explained by an example. To form the falling sync edge 48 shown on time line D of FIG. 2, it is necessary to multiply the digital representation of $-114_{10}$ at the output of the first digital signal generator by a sequence of digital transition gain control values which are rising in value from $0_{10}$ to $1.0_{10}$ and which define a sine squared edge. $E_1$ in FIG. 3 is such a sequence if gain control values. Note that the 1st and 2nd gain control values on the $E_1$ edge shape do not have the same value, but that the 7th and 8th gain control values have the same value. If the sequence of retrieval of gain control values is reversed to form the rising edge 50 on time line D of FIG. 2, a different edge shape will result for the edge 50 than for the edge shape 48 unless the edge $E_{16}$ is selected as the family of gain control points for access. This is because if the edge $E_1$ gain control values are accessed in reverse order, the 8th value becomes the first gain control value by which the digital signal value representing the peak amplitude $-114$ is multiplied and the 7th gain control value becomes the 2nd gain control value used in the multiplication. To get the same edge shape for the edges 48 and 50, the 8th and 7th gain control values for the edge $E_1$ would have to be the different values as the 1st and 2nd gain control values for $E_1$ are. This is not true for $E_1$. However, it is true for the edge $E_{16}$, so the A5 address bit inverts the address bits AM3-AM6 to cause the edge $E_{16}$ to be selected for retrieval of its gain control values during formation of the edge 50. A similar situation excists for formation of all the edges for all the synchronization signals in both the vertical and the horizontal blanking intervals. The A5 signal is generated by the flip flop 90 which reclocks the TP-2 signal at its D input with the TP-3 signal, as reclocked by the flip flop 89 with the 4Fsc clock signal.

Note how all the addressing signals A0 through A7 which will be used to access the pair of PROM's U99 and 111 during storing the digital values to be used in the multiplication are generated such they are synchronous with the 4Fsc clock. This helps maintain a high degree of phase stability in the sytem between the video information signal and the synchronization signals being digitally synthesized and among the synchronization signals themselves.

The signals A0–A7 are used as address inputs to the timing PROM 100 which generates the signals shown on the time lines 11–15 of FIG. 4. These signals provide timing for the digital synthesis of the horizontal blanking, horizontal sync, vertical blanking, the serrations in the vertical sync interval, and the equalizer pulse synchronizing signals. The purpose of the PROM 100 is to decode the address signals A0 through A7 to generate the signals shown on the time lines 11–15 in FIG. 4. This simplifies the generation of the above noted timing signals. The PROMS U99 and U111 cannot be addressed directly using the A0 through A7 address signals because there is a need which will be described below for generation of the timing signals shown on the time lines 11–15 of FIG. 4. These signals are important in causing the correct generation by the first digital signal generator of the digital signal values which represent the peak amplitude values of the various synchronizing signals for the various television standards for which synchronizing signals are to be generated. To use discrete logic to decodethe address signals and generate the needed timing signals would greatly complicate the circuit.

The Boolean expressions pointing to various times on the tiem lines in FIG. 4 indicated addresses which will cause the output on the bus 102 of a particular binary word. Each bit of each of these binary output words has the logical state indicated for the signal corresponding to that bit on the time lines 11–15 in FIG. 4. The corresponding condition of the address bits A0–A7 that cause the generation of each output binary word D0–D7 at any particular time are reflected in the Boolean expression of the address bits corresponding to that particular time. These binary output words are reclocked by a latch 104 comprised of 8 D type flip flops clocked by the 4Fsc clock at pin 11. The outputs of these latches are the signals: SYNC/BURST, NARROW BLKG B, WIDE BLANKING, WIDE BURST, NARROW BLKG A, and ENVELOPE SHARIGN AM0 through AM2. The purpose of ecah of these signals will be explained below in connection with a description of the logic to which these signals are inputs.

The SYNC/BURST signal on time line 14 is low from the leading edge of the horizontal blanking interval to the end of the horizontal sync interval whereupon it goes high during the burst period and stays high until the next start of blanking. This signal makes a similar transition during the vertical blanking interval.

Figure 5C:
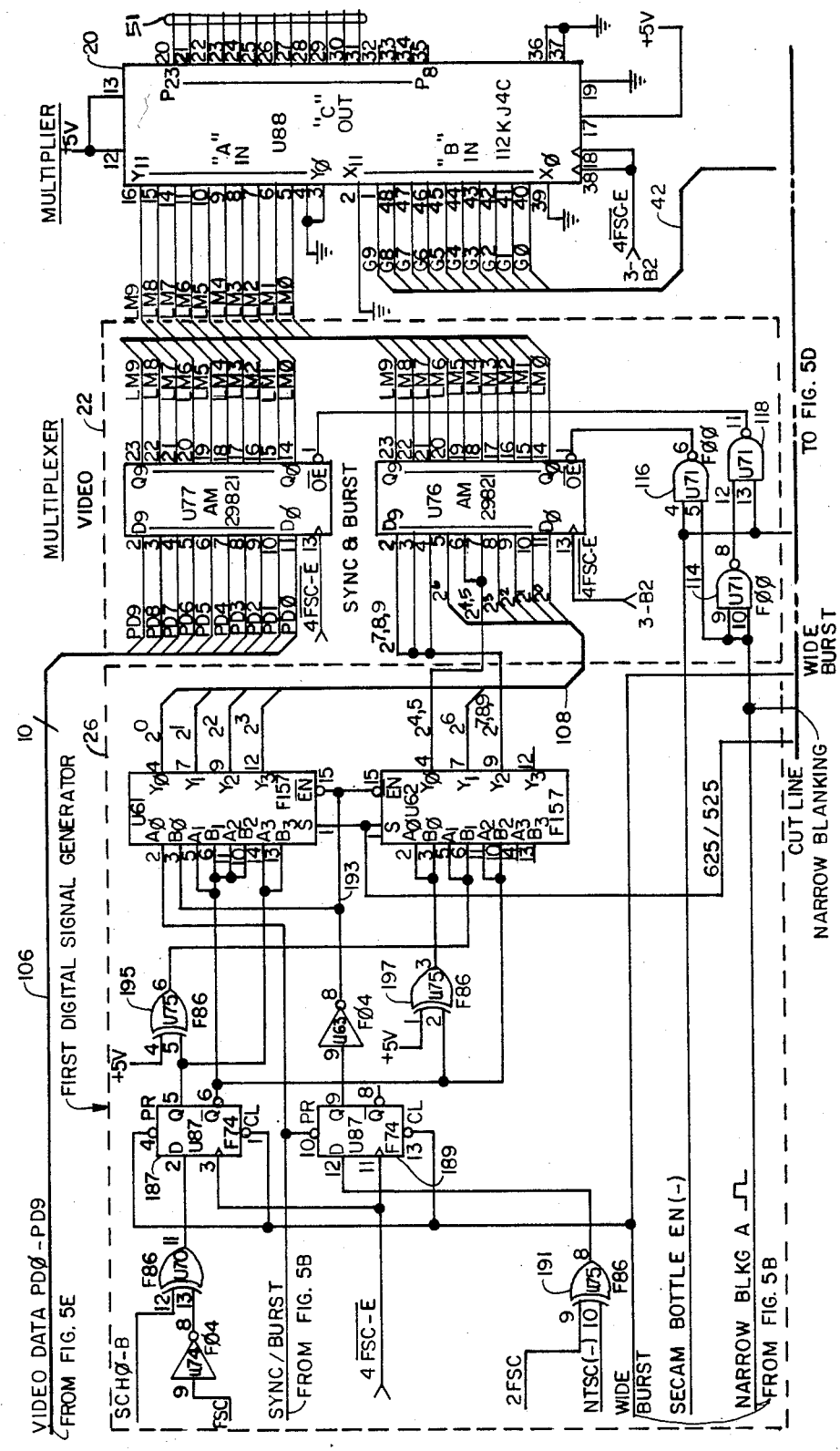
Figure 5D:
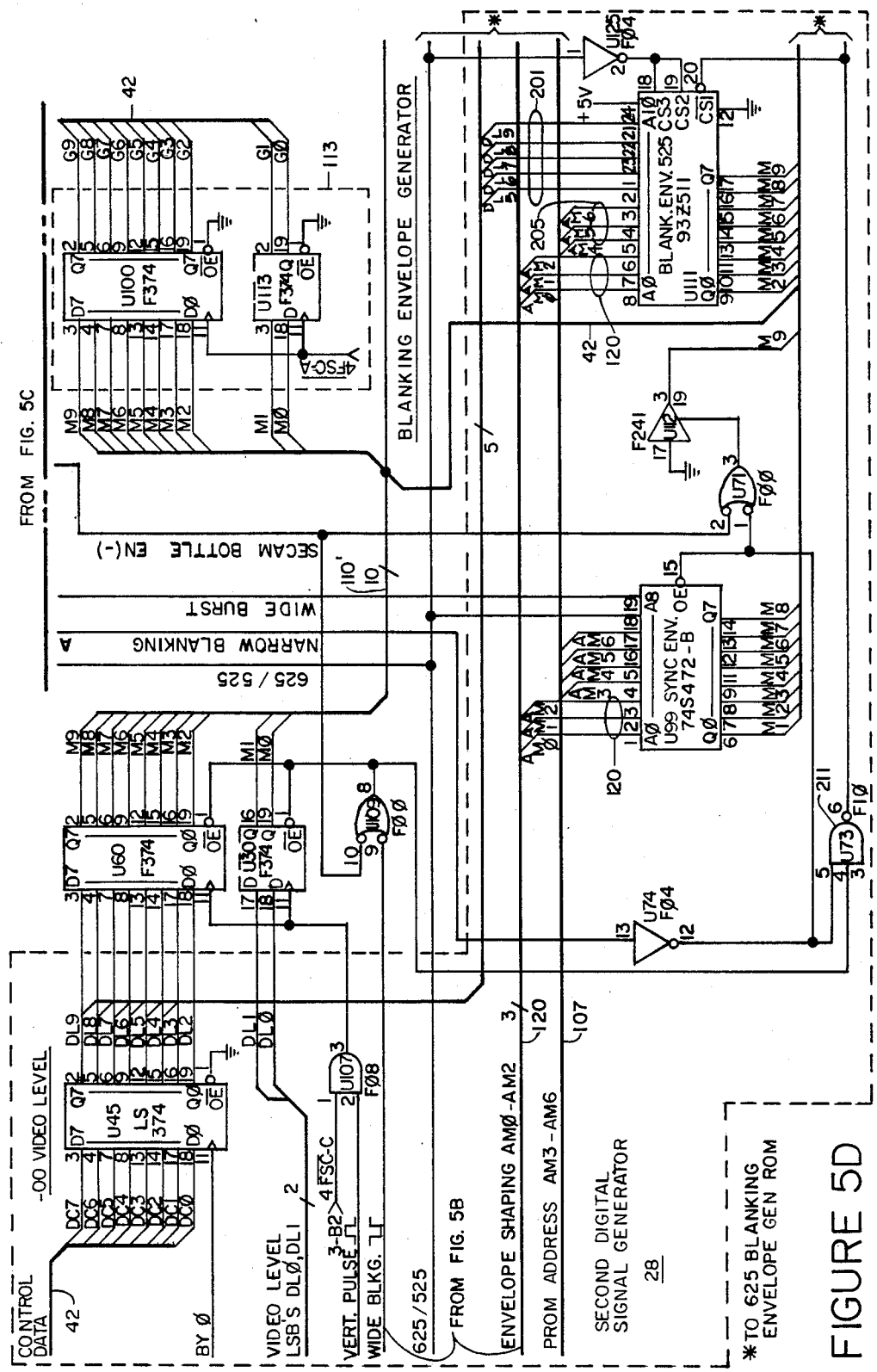

The SYNC/BURST signal is coupled to an input of the first digital signal number generator 26 to signal that logic when the transition between sync and burst occurs. This causes the first digital signal number generator to change the digital signal value at its output from the value representing the peak amplitude of sync to the values representing the peak amplitudes of the burst signal. To understand how this occurs the reader should refer to FIGS. 5C and 10. FIG. 5C shows that the multiplexer 22 has the input for receiving the output of the first digital signal number generator coupled by a bus 108 to the output of two multiplexers U61 and U61. These multiplexers output 10 bit digital data representing the magnitude and sign of the peak amplitudes of all synchronizing signals. FIG. 108 represents the binary bit patterns which represent the peak amplitudes of the synchronizing signals to be generated and their relationship to the signals depicted in FIG. 10A. The signals in FIG. 10A represent the signals which generate and are the bit patterns shown in FIG. 10A. The identification of which lines represent which bits is indicated by the bit significance indicators such as $2^0$ written above each line from the output of the multiplexers U61 and U62.

The line labelled $2^0$ is the least significant bit in the 10 bit data and is coupled to pin 11 of U76.

The assignment of digital levels for the peak amplitudes of each of the synchronizing signals in the horizontal and vertical blanking intervals (in terms of their analog equivalents in the decimal number system) are as follows: sync$=-114$; burst$=+57$ and $-57$ for alternating peaks; blanking$=0$; and peak white$=+414$.

The same values are used for the peak amplitudes of the synchronizing signals in the vertical blanking interval. It is well known that the NTSC standard requires that the equalizing pulses and the serrations in the vertical sync interval start from the same level as the horizontal sync pulse and have the same peak amplitude as the horizontal blanking level. It is also well known that the vertical sync interval starts from the horizontal blankig level and has a peak amplitude equal to the peak amplitude of the horizontal blanking level. The remaining synchronizing signals in the interval of the vertical blanking interval following the post equalizing pulse interval are repetitions of the synchronizing signals in the horizontal blanking interval. The color burst interval is present in the vertical blanking interval portion following the post equalizing interval only if color video information signals are being processed. Different digital peak amplitude levels are used for PAL standards synchronizing signal generation.

The bit patterns for the sync, blanking and burst synchronizing signals show certain characteristic patterns which are used to advantage in simplifying the circuit of the first digital signal number generator 26. For example, all the bits in the bit positions $2^7$, $2^8$ and $2^9$ (the sign bit) are always the same and only toggle between the logic zero and the logic one state to represent certain levels. As a consequence, the lines representing these bits are ganged together. The same is true for the bits in the bit positions $2^4$ and $2^5$. All the other bits are unique. During the burst intervals in either the horizontal or vertical blanking interval, the SYNC/BURST signal is a logic one and the WIDE BURST is a logic one. These two signals are coupled to the preset and clear inputs of two flips 187 and 189 as shown in FIG. 5C. Both of these flip flops are Fairchild Fast 74F74's.

Thus, during the burst intervals, both of the flip flops 187 and 189 will be free running in synchronization with the 4Fsc clock signal and without interference from signals at their preset and clear inputs, both of which are active low. The result is as follows during the burst intervals. Both flip flops are clocked by the 4Fsc clock pulses. The D input of the flip flop 187 is coupled to a clock running at an Fsc rate through the inverter U74 and the exclusive-or gate U70. The other input of the exclusive-or gate U70 is coupled to a decoder (not shown) which decodes signals from the user console indicating which television standard is to guide processing. This signal either inverts the Fsc clock signal through the exclusive-or gate or passes it through the gate without inversion depending upon the standard in effect. The D input of the flip flop 189 is coupled to the 2Fsc clock through an exclusive-or gate 191, which either inverts the 2Fsc clock signal or passes it uninverted depending upon the state of the NTSC($-$) standards determining signal decoded from inputs from the user console. When operating under the NTSC standard, this signal is a logic zero, and the gate 191 is transparent. The Q output of the flip flop 189 will thus toggle from logic zero for 2 cycles of the 4Fsc clock to logic one for 2 cycles of the 4Fsc clock. This output is coupled through an inverter U63 to the enable inputs of the two multiplexers U61 and U62 by the line 193. When the signal on the line 193 is a logic zero, the multiplexer outputs will be enabled and will present the bit pattern of the selected input on the output bus 108. When the multiplexer outputs are not enable, they will present an all zero bit pattern on the output bus 108. These all zero bit patterns represent the zero base-line level of the burst signal shown in FIG. 2B. The zero level base-line segments will ultimately represent the burst zero crossings in the analog filtered output. Their temporal positions will not change with changes in the preload count loaded into the counter U72 on FIG. 5A, because these zero base-line segments are generated in synchronization with the clock signals and not in response to the A0 through A7 address signals whose temporal positions do change with a changing preload count in U72. This is the manner in which the coarse adjustment of the sync to subcarrier phase is accomplished since the sync to subcarrier phase is measured from the edge of sync to a zero crossing in the burst interval. The temporal positions of the sync, blanking and burst envelope edges change with a changing preload count, but the zero crossings in the burst interval do not change with a changing preload count. Thus, the sync to subcarrier phase can be changed by one quadrant at a time by changing the preload count in U72.

The particular input of the multiplexers U61 and U62 which is selected is controlled by a signal 625/525 from the standards decoder (not shown). This signal indicates which of the variuos standards is in effect. Since the peak amplitude levels for the various synchronization signals are different under the different standards, the input data for the A and B inputs to the multiplexers U61 and U62 are set so that one input data pattern represents the peak amplitude levels for sync and burst under one standard and the other input data pattern represents the peak amplitude levels for the sync and burst signals under another standard. The signal 625/525 then selects the appropriate input data pattern depending upon the particular standard then in effect.

During the burst period, the peak amplitudes alternate sequentially from 0 to +57, then back to 0, then to −57, then back to 0 to complete one complete cycle of subcarrier, i.e., one Fsc clock cycle. The signal on line 193 controls the transition of the output bits to the 0 level by disabling the outputs of the multiplexers U61 and U62 at the appropriate times, as will be appreciated by those skilled in the art. The exclusive-or gates 195 and 197 combine with the flip flops 187 and 189 and the inverter U63 to decode the input signals described above to cause the appropriate bit patterns to appear on the A and B inputs of the multiplexers U61 and U62 at the appropriate times and for the appropriate durations. The manner in which this decoding is done will be apparent to those skilled in the art from a study of the interconnections shown in FIG. 5C, the timing of the signals shown on FIGS. 4 and 10 and from the various bit patterns under the NTSC standard shown on FIG. 10B. This decoding at the inputs of the multiplexers causes the appropriate digital signal values representing the peak amplitudes of the various synchronizing signals in the horizontal and vertical blanking intervals to appear at the appropriate times and the appropriate durations for the various standards on the output bus 108, which is coupled through the multiplexer 22 at appropriate times to the A input of the multiplier 20.

Returning to a consideration of the other signals generated by the timing PROM 100 on FIG. 5B, the WIDE BURST signal is a signal which indicates the presence of a burst interval. It will not be generated when the BURST GATE and BURST OFF (-) signals indicate no burst is to be generated. WIDE BURST goes high before the start of the color burst interval during color processing under certain standards, i.e., the edge D on time line 1 in FIG. 4, and goes low after the end of the burst interval, i.e., the edge E on time line 1. As noted earlier, the WIDE BURST signal is used to preset the flip flop 187 Q and Q not outputs to a logic one during the sync intervals, and is used as one address bit to the PROMs U99 and 111 along with the 625/525 standard defining signal to prevent a burst from being formed under certain standard dependent conditions. There are also generated a WIDE BLANKING signal and NARROW BLANKING A and NARROW BLANKING B signals. These signals will be discussed below in conjunction with the logic to which they are coupled. The only difference between the NARROW BLANKING A and NARROW BLANKING B signals is that one is slightly delayed from the other and can be used for timing logic downstream where propagation gate delays have delayed the arrival of signals to be timed thereby.

Turning to FIG. 5C, the logic of the remaining portions of the second digital number generator 28, the multiplexer 22 and the multiplier 20 not already discussed will be described. The multiplier 20 is a TRW 112KJ4C which accepts one digital number at its A inputs Y0-Y11 and multiplies it by another digital number it receives at its B inputs X0-X11. The A inputs are coupled to the outputs of two AMD29821 high performance bus interface registers U77 and U76 which form the multiplexer 22. Each of these flip flops consists of a plurality of D flip flops having their D inputs coupled to the input port consisting of pins 2–11 and having their clock inputs ganged to a pin 13 which is coupled to the 4Fsc clock signal. Each of these flips flops has its Q output coupled to one of the output pins 14 through 23 all of which are simultaneously enabled or disabled by the state of an output enable signal at a pin 1 which is coupled to a gating circuit to be described in more detail below. shifted, 10 bit, 2's complement format digital video data on a bus 106 from the video signal processor 24. U76 has its inputs coupled to a bus 108 which carries the digital signal values which define the peak amplitudes of the various synchronizing signals.

The multiplexer 22 couples either the outputs of U77 or of U76 to the A inputs, i.e., the A input on FIG. 1, depending upon which one of them is enabled by the gating circuit. The gating circuit is coupled to the NARROW BLANKING A signal from the timing PROM 100, and enables the U76 latch outputs during the horizontal and vertical blanking intervals. This connects the digital signal values from the first digital signal number generator 26 to the A input of the multiplier when the peak amplitude digital signal values are to be inserted into the stream of video information digital data coming in on the bus 106. This allows the formation of new digital format synchronization signals.

As noted above, the switching action by the multiplexer 22 is controlled by the horizontal blanking signal NARROW BLANKING A which is gated with a signal SECAM BOTTLE EN (−) by the gates 114, 116 and 118. The SECAM BOTTLE EN (−) signal is a logic one during all NTSC and PAL operation and only is asserted at the logic zero level during the vertical blanking interval of SECAM operation. Thus for all of the time during NTSC and PAL operation, SECAM BOTTLE EN (—) is a logic one. The NARROW BLANKING A signal is a logic one during the time from just after the leading edge of blanking, i.e., edge A in FIG>4, to a time just before the trailing edge of blanking, i.e., the edge F in FIG. 4. When NARROW BLANKING A is a logic one, and SECAM BOTTLE EN (—) is a logic one, the gate 116 input is low thereby enabling the sync and burst latch U76 and passing the digital data from the first digital signal number generator 26 through to the A input port of the multiplier 20. The gate 114 inverts NARROW BLANKING A signal thereby causing the gate 118 to disable the multiplexer latch U77 outputs. This cuts off the video data on the bus 106 from reaching the A input of the multiplier 20 when the peak amplitude digital signal values are being input to the multiplier. Note how the integration of the digital data representing the peak amplitudes of the synchronizing signals to be digitally synthesized are inserted into the video information digital data stream precisely at the right time controlled by the reference sync signal generator 27 and synchronously with the clock which is clocking in the digital sample data representing the video information or picture portion of the overall television signal. The gate 118 output enables the outputs of the latch U77 during the times when the NARROW BLANKING A signal is a logic zero, i.e., outside the vertical and horizontal blanking intervals.

The reason the NARROW BLANKING signal is used to generate the enabling signals to U77 and U76 of the multiplexer 22 is because the video is at blanking level and the multiplier gain is zero at the edge transitions of the narrow blanking signal. This prevents generation of spurious signals during the switching action of the multiplexer. In alternative embodiments, a new overlapping blanking signal could be coupled to the A inputs of the multiplier 20 to be multiplied by the gain numbers on the bus 42 instead of relying on the blanking pulse in the original video. Reliance on the original signal blanking pulse is used in the preferred embodiment, because the timing of the blanking is not as critical as that of sync and burst, and it makes the circuit sampler.

The digital signal values from the first digital number generator 26 are multiplied in the multiplier 20 by the digital transition edge gain control numbers ranging in the decimal number system from 0 to 1.0. These gain control numbers are retrieved from the PROMs U99 and 111 in FIG. 5D, and applied to the 8 input of the multiplier 20 by a bus 42. The PROM U99 stores gain control numbers to define the edge shapes for only the horizontal and vertical synchronizing signals, the pre and post equalizing pulses and the serrations in the vertical sync pulse. The digital transition edge gain control values which define the edge shapes for the horizontal and vertical blanking intervals are stored in the PROM U111 for reasons which will be made clear below. As regards PROM U99, during the blanking periods, the gain numbers on the bus 42 are digital numbers which would represent the transition edge gain control numbers. For the horizontal blanking interval, they would, if converted to analog voltages, represent the waveform on time line 1 of FIG. 4A. For the vertical blanking interval, the digital transition edge gain control numbers would in analog voltage form define a signal similar in nature to that on time line 1 of FIG. 4 except that it would define the times of occurrence and shape of the edges of the synchronization signals in the vertical blanking interval, viz., the pre and post equalizing pulses, the vertical sync interval and the serrations therein, and the horizontal blanking interval signals following the post equalizing pulse interval in the vertical blanking interval.

During times between horizontal and vertical blanking intervals, the multiplier 20 B inputs receive digital gain control numbers sent from a user console on a bus 42 through a decoder U45, a reclocking latch U60, the bus 110' and the latch 113 for the purpose described above. The advantage of this is that a digital gain control function for the video information signals can be simply implemented without adding very much new circuitry. This also makes more effective use of the multiplier 20 which is quite expensive. By using it during times when it would otherwise be idle if used solely for digital synthesis of the synchronizing signals, the whole system is rendered more cost effective.

As noted above, the digital transition edge gain numbers which define the desired edge shape for the horizontal and vertical blanking synchronization signals is stored in PROM U111. This PROM store gain control numbers for a 525 line NTSC standard video blanking pulse. Another PROM (not shown) is used to store the gain numbers defining the desired edge shape for the horizontal and vertical blanking synchronization signals used in the 625 line PAL standard. The PROM U111 is enabled only during the intervals during which the leading edge and trailing edges of the vertical and horizontal blanking intervals are being formed. The reason that the gain control numbers for the blanking synchronizing signals are not stored in the PROM U99 is that the rise times of the blanking intervals very arbitrarily with the gain setting. The edges of the blanking synchronization signals must make a smooth, precisely shaped transition from the amplitude level of the video information signal to the blanking level. Since the video information signal level is depended upon the gain level set by the operator, special circuitry is needed to accommodate the varying video information gain level.

This special circuitry is the PROM U111 and a bus 201 which couples video information gain control data into the address inputs of the PROM. The PROM U111 has stored therein several families of gain control values. Each family defines a sine squared shape which makes a transition from a particular video amplitude level to the blanking level. The address inputs coupled to the bus 201 receive a bit pattern which is set by the operator and which defines the desired video gain level. The bus 201 is coupled to the 5 most significant bits of the output of the latch U45. This latch receives video gain control data from the operator console. The bits on the bus 201 cause the selection of the proper family of gain control values for the video gain level existing at the start of any particular blanking interval whether it is horizontal or vertical blanking.

The PROM U111 is enabled only during the intervals when the leading and trailing edges of the blanking intervals are being formed by ANDing the NARROW BLANKING and the WIDE BLANKING signals together. From FIG. 4, time lines 12 and 13 it is seen that if these two signals are ANDed, the result will be a pulse which has a duration equal to the difference in times between the transition 203 on time line 12 and the transition 205 on the time line 13. This is the interval during which the edge A on time line 1 is being formed which is the leading edge of the blanking interval. A similar result occurs for the edge F which is the trailing edge of the blanking interval where the pulse has the duration equal to the time between the transition 207 and 209. This AND function is implemented by the NAND gate 211 on FIG. 5D. This gate has as its two inputs the properly inverted WIDE BLANKING and NARROW BLANKING A signals. The output of the gate 211 is coupled to the chip select input of the PROM U111 which is active low. This results in the PROM U111 being active only during the proper intervals.

There are 8 families of gain control values for each selected gain level. Each has a slightly different phase with respect to the zero crossings of the burst synchronization signal. The particular one of these families selected is controlled by the bit pattern on the bus 205. This bus carries 3 address bits, AM4 through AM6, from the sync to subcarrier phase adjustment circuitry which select the desired sync to subcarrier phase. Thus it is seen that the sync to subcarrier phase can be adjusted digitally in the system by moving the temporal position of the blanking and sync edges relative to the zero crossings of the burst synchronization signal.

Once the particular one of the families of gain control values is selected, the particular one of the gain control values which is output at any particular time is established by the bit pattern on the bus 120 which carries the address bits AM0 through AM2 from the timing PROM 100. The order of retrieval of these gain control values is controlled as is done for the PROM U99.

The address bits AM0 through AM2 are generated from the A0 through A7 address bits generated by the logic on FIGS. 5A and 5B. The logic on FIGS. 5A and 5B generates the A0 through A7 address bits and the timing signals based upon the incoming reference sync and clock signals from the reference sync signal generator which is itself running synchronously with the house reference clock signal. Since the video information processing signal is also running synchronously with the house reference clock, it is seen that the timing of the edge formation of the various synchronizing signals can be precisely controlled relative to the video information signal.

The PROM addressing bits on the bus 120 cycle through the addresses to select the transition edge gain control number 1-8 sequentially. The transition edge gain control numbers output from the PROM are placed on a bus 42 and reclocked through a latch 113 clocked by the 4Fsc clock. The gain control values are then coupled to the B input port of the multiplier 20 and are used to multiply the numbers at the A input thereby producing the output stream of digital numbers at port C of the multiplier.

Figure 5E:
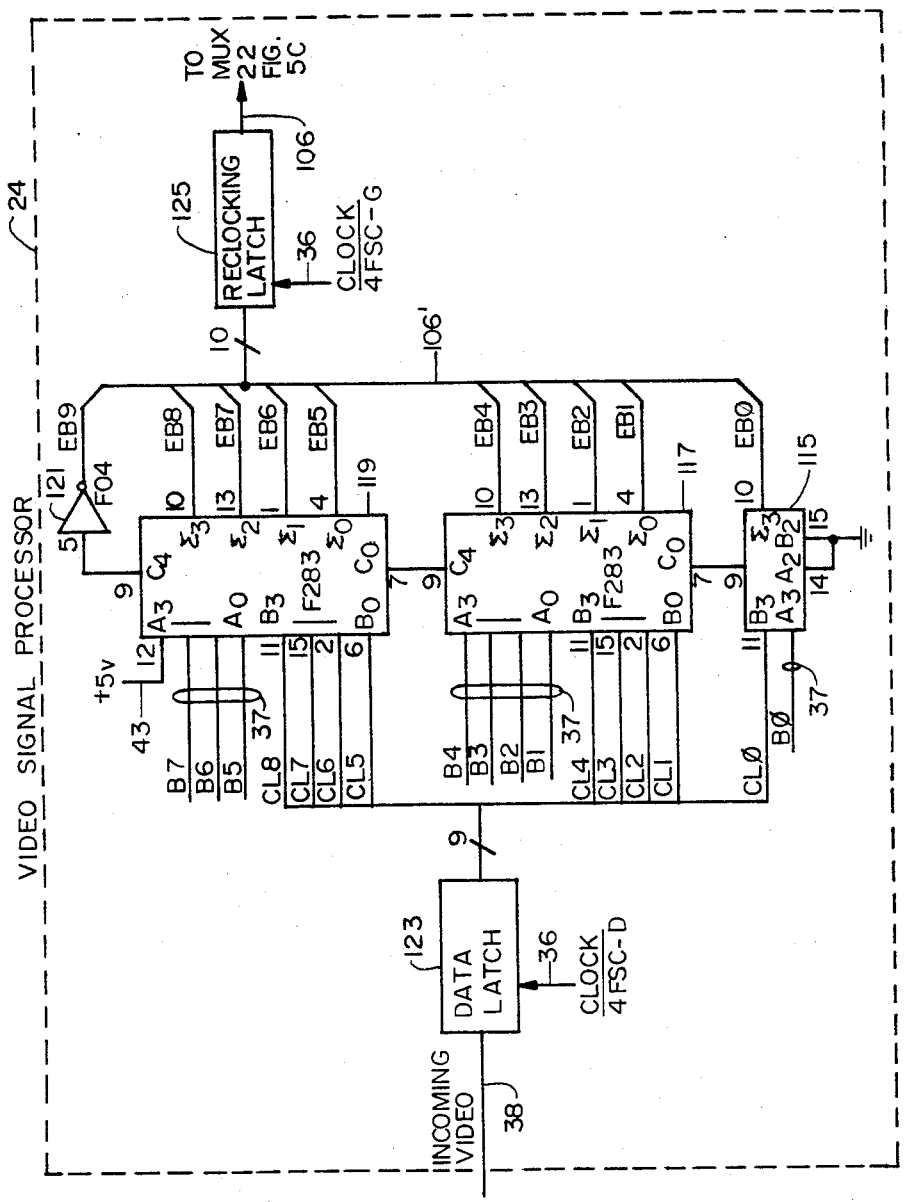

FIG. 5E shows the logic of the video signal processor 24. In the digital video information signal embodiments such as is shown in FIG. 5, the video signal processor 24 subtracts $128_{10}$ digital levels from the incoming digital video information samples entering from the left on the bus 38 by adding 384 digital levels to the incoming binary data. These video information samples of the incoming binary data are digital numbers representing the results of an analog to digital conversion of the video signal at a certain sampling rate. In the preferred embodiment, the sample rate is 4 times the subcarrier frequency. The video signal processor also converts the digital video sample data to two's complement form to make it compatible with the operation of the multiplier 20. Further, the video signal processor converts the incoming 9 bit data to 10 bit data by adding a sign bit which is 0 for levels above the blanking level and 1 for levels below the blanking level. The overall effect of the video signal processor is to convert the blanking level, which is at $128_{10}$ in the incoming video data, to $0_{10}$ in the outgoing 9 bit 2's complement data and to add a sign bit as the 10th bit.

The above described function is done with three 4 bit binary full adders with carry 115, 117 and 119, a clocking latch 123 and a reclocking latch 125. The incoming digital data is coupled into the B inputs of the adders through the clocking latch 123, which is clocked by the 4Fsc clock so that its arrival at the adders is synchronous with the rest of the system. The carry out of each adder is coupled to the carry in of the adder for the nibble of next higher significance. The carry out of the most significant adder 119 is coupled through an inverter 121 to the 10th bit of the output data bus 106'. The B inputs of these adders are coupled to the 9 bit digital video information input data. The $B_3$ input of the adder 115 is the least significant bit of the input data, CL0, and the $B_3$ input of the adder is the most significant bit of the 9 bit input data, CL8. This binary video information input data has levels which vary from $0_{10}$ to $512_{10}$ with sync tip at 14 and blanking level at 128. The object is to convert the blanking level to $0_{10}$ and to add a sign bit as the 10th bit thereby converting to two's complement format. To do this, $384_{10}$ is added to the input binary and the overflow out the carry of the adder 119 is inverted and coupled to the 10th bit or sign bit of the output bus 106'. This is done as follows.

The A inputs of the adders are coupled by a bus 37 to an 8 bit number comprised of the bits B0 through B7 from a constants generator. The constants generator is actually a black level adder, but for purposes of the invention, the bits B0 through B7 carry a bit pattern equal to $128_{10}$. That is, bit B7 is a logic one, and all other bits are logic zeroes. The $B_2$ and $A_2$ inputs of the adder 115 are grounded to keep them from floating. Thus if the bus 37 were alone, only 128 would be added. However, the $A_3$ input of the adder 119 is also coupled to a logic one by the wire 39 which represents a binary number 1 0000 0000 or $2 \times 10^9$ which equals 256. Thus 256 plus 128 are added to the input binary data for a total of 384 digital levels which are added as a bias to the input data. The result is that the blanking level of $128_{10}$ in the input binary data describing the video information is converted to $512_{10}$ which is 10 0000 0000 or $2^{10}$. The 10th bit which is a logic one representing the level $512_{10}$ flows out of the carry out output, pin 9 on adder 119 and is inverted to become a sign bit of 0. The resulting output word on the bus 106' for the $128_{10}$ blanking level input is 10 0000 0000 or $0_{10}$ in 9 bit data plus a 0 sign bit as the 10th bit to make up a 10 bit output word. All input values above $128_{10}$ will have a zero sign bit plus a bit pattern representing $X_{10} + 384_{10} - 512_{10}$ where X in the decimal equivalent of the input binary.

These 10 bits on the bus 106' are reclocked onto the output bus 106 by the reclocking latch 125, which is clocked by the 4Fsc clock signal on the line 36 as is the input clocking latch 123. The resulting converted data is coupled to the multiplexer 22 on the output bus 106.

The output of the multiplier 20 on the bus 112 is a stream of digital numbers representing the composite video signal with digitally controlled video gain and new, digitally synthesized horizontal sync, equalizing pulses, vertical sync interval, serrations in the vertical sync interval, color burst and horizontal and vertical blanking synchronizing signals. The circuitry that may be used to implement the digital to analog conversion of the converter 39 and the filtering of the filter 41 in FIG. 1 is well known to those skilled in the art, and will not be described here.

Although the invention has been described in terms of the embodiment described above, it will be apparent to those skilled in the art that numerous modifications can be made such as by changing the order of steps in the control process or eliminating steps or items of circuitry. All such modifications, if they fall within the spirit of the invention, are intended to be covered by the claims set out below.

What is claimed is:

1. An apparatus for digitally generating a synchronizing signal for a video signal and for digitally controlling the gain of said video signal, comprising:
   first means for supplying digital signal values which represent the amplitude peaks of said synchronizing signal;
   second means for supplying digital synchronizing signal gain control values which are a digital representation of the edge shape of said synchronizing signal, said gain control values occurring during the interval defined by the commencement and conclusion of each synchronizing signal interval;
   means for multiplying the digital vlaues from said first means times the digital values from said second means and for outputting digital signal values representing the digital products of said multiplications as digital representations of said synchronizing signal; and
   means for sharing said means for multiplying for video signal gain control purposes by accepting video data defining said video signal and accepting video signal gain control data defining the desired gain for said video signal and for coupling both said video data and said gain control data to said means for multiplying for multiplicaton when said synchronization signals are not being generated by said means for multiplication thereby altering the gain of said video signal represented by said video data.

2. An apparatus as defined in claim 1 further comprising means for converting said digital products to an analog synchronizing signal.

3. The apparatus of claim 1 wherein said first means includes means for generating a reference signal indicating the time and interval of said synchronizing signal.

4. The apparatus of claim 1 further comprising means for supplying said video signal and means for inserting said synchronizing signal at a predetermined interval in said video signal.

5. The apparatus of claim 1 wherein said second means stores a set of digital gain control values which are a digital representation of a sine$^2$ edge shape.

6. The apparatus of claim 1 wherein said second means stores a single set of digital gain control values which define all edges of said synchronizing signal.

7. The apparatus of claim 1 wherein said synchronizing signal includes a sync signal and a burst signal comprised of a plurality of cycles of a subcarrier signal and wherein said second means stores a family of sets of digital gain control values where each set defines the shapes of the edges of said synchronizing signal and each set has a different sync to subcarrier phase relationship.

8. The apparatus of claim 7 further comprising third means to supply reference sync signals indicating the times and durations for said sync signal and said burst signal and fourth means in said second means for receiving said reference sync signals and for generating address signals therefrom to access a specific set in said family of sets of gain control values and for accessing the gain control values in the selected set for couplig to said means for multiplying.

9. An apparatus for digitally generating a synchronizing signal comprising:
   first means for supplying digital signal values which represent the amplitude peaks of said synchronizing signal;
   second means for supplying digital gain control values whlich are a digital representation of the edge shape of said synchronizing signal, said gain control values occurring during the interval defined by the commencement and conclusion of each synchronizing signal interval;
   means for multiplying the digital values from said first means times the digital values from said second means and for outputting digital signal values representing the digital products of said multiplications; and
   wherein said synchronizing signal includes a sync signal and a burst signal comprised of a plurality of cycles of a subcarrier signal and wherein said secondm eans stores a family of sets of digital gain control values where each set defines the shapes of the edges of said synchronizing signal and each set has a different sync to subcarrier phase relationship; and
   further comprising third means to supply reference sync signals indicating the times and durations for said sync signal and said burst signal and fourth means in said second means for receiving said reference sync signals and for generating address signals therefrom to access a specific set in said family of sets of gain control values and for accessing the gaincontrol values in the selected set for coupling to said means for multiplying; and
   further comprising fifth means in said second means for allowing the user to input a signal indicating the desired sync to subcarrier phase and for responding to said signal by causing said fourth means to generate said address signals to select the proper set of gain control values having the selected sync to subcarrier phase.

10. The apparatus of claim 8 further comprising multiplexer means having a video data first input for receiving said video data and a second input for receiving said digital signal values from said first means and has an output and having a control input coupled to said third means for receiving a reference signal controlling switching between said first and second inputs, and wherein said means for multiplying has a first input coupled to the output of said multiplexer means and has a second input coupled to the output of said second means.

11. An apparatus for digitally generating a synchronizing signal for a video signal represented by digital video data comprising:
   first means for supplying digital signal values which represent the amplitude peaks of said synchronizing signal;
   second means for supplying digital gain control values which are a digital representation of the edge shape of said synchronizing signal, said gain control values occurring during the interval defined by the commencement and conclusion of each synchronizing signal interval;

means for multiplying the digital values from said first means times the digital values from said second means and for outputting digital signal values representing the digital products of said multiplications; and wherein said synchronizing signal includes a sync signal and a burst signal comprised of a plurality of cycles of a subcarrier signal and wherein said second means stores a family of sets of digital gain control values where each set defines the shapes of the edges of said synchronizing signal and each set has a different sync to subcarrier phase relationship; and further comprising third means to supply reference sync signals indicating the times and durations for said sync signal and said burst signal and fourth means in said second means for receiving said reference sync signals and for generating address signals therefrom to access a specific set in said family of sets of gain control values and for accessing the gain control values in the selected set for coupling to said means for multiplying; and further comprising multiplexer means having a video data first input for receiving said video data and a second input for receiving said digital signal values from said first means and has an output and having a control input coupled to said third means for receiving a reference signal controlling switching between said first and second inputs, and wherein said means for multiplying has a first input coupled to the output of said multiplexer means and has a second input coupled to the output of said second means; and further comprising digital gain control means for receiving an input signal from a user and for supplying digital video information gain control values to said second input of said multiplier means to control the gain of said video information signal.

12. The apparatus of claim 11 wherein said synchronizing signal includes a blanking signal and wherein second means includes a blanking edge shaping means for storing a plurality of sets of digital blanking transition edge gain control values which define the shapes of a plurality of edges for said blanking signal, each said set of blanking transition edge digital gain control values defining the shape of a blanking edge from a particular gain level to the blanking level, said blanking edge shaping means having address inputs coupled to said digital gain control means for receiving signals indicating the current gain level, said address signals causing the selection of the proper set of blanking transition edge gain control values for the current gain level.

13. The apparatus of claim 12 wherein said blanking edge shaping means includes address inputs coupled to said fourth means for receiving address signals which cause the access of the blanking transition edge gain control values from the selected set for coupling to said second input of said means for multiplying.

14. The apparatus of claim 6 wherein said second means is a memory having address inputs, control inputs and data outputs and further comprising means for generating a plurality of address and control signals which are coupled to said address and control inputs so as to cause said memory to synchronously output said gain control values at appropriate times to define the edges of said synchronizing signal as $sine^2$ shaped edges.

15. The apparatus of claim 6 further comprising complementing means for reversing the sequence of access of said gain control values during formation of predetermined edges.

16. An apparatus for digitally generating a synchronizing signal for a video signal represented by digital video data comprising:

first means for supplying digital signal values which represent the amplitude peaks of said synchronizing signal;

second means for supplying digital gain control values which are a digital representation of the edge shape of said synchronizing signal, said gain control values occurring during the interval defined by the commencement and conclusion of each synchronizing signal interval;

means for multiplying the digital values from said first means times the digital values from said second means and for outputting digital signal values representing the digital products of said multiplications; and wherein said second means stores a single set of digital gain control values which define all edges of said synchronizing signal; and wherein said second means is a memory having address inputs, control inputs and data outputs and further comprising means for generating a plurality of address and control signals which are coupled to said address adn control inputs so as to cause said memory to synchronously output said gain control values at appropriate times to define the edges of said synchronizing signal as $sine2$ shaped edges; and wherein said second means is a memory having address inputs, control inputs and data outputs and further comprising complementing means for generating a plurality of address and control signals which are coupled to said address and control inputs of said second menas so as to cause said memory to synchronously output said gain control values in a first sequence at the appropriate time to define a first edge of said synchronizing signal and to cause said memory to synchronously output said gain control values in the reverse sequence at the appropriate time to define a second edge of said synchronizing signal.

17. The apparatus of claim 4 wherein said means for multiplying has a first input for receiving either said video signal or said digital signal values which represent the amplitude peaks and has a second input for receiving said synchronizing signal gain control values, and wherein said means for inserting is a multiplexer means having a first input for receiving said video signal, a second input coupled to said first means, an output coupled to said first input of said multiplier, and a control input coupled to said reference signal for controlling switching of said multiplexer such that the output of said first means is supplied to said multiplier during a blanking interval of said video signal, said multiplexing means for selecting either said video signal or said digital signal values representing the amplitude peaks of said synchronizing signal for coupling to said first port of said multiplexer depending upon the status of said reference signal.

18. The apparatus of claim 17 wherein said multiplexer means includes a multiplexer having a first input coupled to said means for supplying a video signal and a second input coupled to said first means, and having a control input coupled to said reference signal and having an output, said multiplying means further comprising a digital multiplier having a first input coupled to said output of said multiplexer and having a second input coupled to said second means.

19. The apparatus of claim 18 further comprising means coupled to said multiplying means for converting said digital products to an analog synchronizing signal.

20. The apparatus of claim 4 wherein said means for supplying a video signal supplies digital values representing the amplitude of a video signal, said digital values being supplied synchronously with a clock signal.

21. An apparatus for digitally generating a synchronizing signal for a video signal represented by digital video data comprising:
- first means for supplying digital signal values which represent the amplitude peaks of said synchronizing signal;
- second means for supplying digital gain control values which are a digital representation of the edge shape of said synchronizing signal, said gain control values occurring during the interval defined by the commencement and conclusion of each synchronizing signal interval;
- means for multiplying the digital values from said first means times the digital values from said second means and for outputting digital signal values representing the digital products of said multiplications; and
- further comprising means for supplying said video signal and means for inserting said synchronizing signal at a predetermined interval in said video signal;
- wherein said means for supplying a video signal supplies digital values representing the amplitude of a video signal, said digital values being supplied synchronously with a clock signal; and
- wherein said means for supplying a video signal, said second means and said means for multiplying all are coupled to the same clock signal which controls the timing of the output of said digital video data from said means for supplying said video signal.

22. An apparatus as defined in claim 21 wherein said first means includes means for generating a reference signal indicating the time and interval of said synchronizing signal and wherein said means for inserting is a multiplexing means having a first input coupled to said means for supplying a video signal and having a second input coupled to said first means, and having a control input coupled to said means for supplying a reference signal and having an output, said multiplexing means for coupling either said first input or said second input to said output depending upon the state of said reference signal, said multiplying means further comprising a digital multiplier having a first input coupled to said output of said multiplexer and having a second input coupled to said second means.

23. The apparatus of claim 22 further comprising means for converting said digital products from said multiplier to an analog synchronizing signal.

24. The apparatus of claim 23 wherein said means for converting is a digital to analog converter having its input coupled to said multiplier and having an output and a low pass filter having its input coupled to the output of said digital to analog converter.

25. An apparatus for digitally generating a synchronizing signal for a video signal represented by digital video data comprising:
- first means for supplying digital signal values which represent the amplitude peaks of said synchronizing signal;
- second means for supplying digital gain control values which are a digital representation of the edge shape of said synchronizing signal, said gain control values occurring during the interval defined by the commencement and conclusion of each synchronizing signal interval;
- means for multiplying the digital values from said first means times the digital values from said second means and for outputting digital signal values representing the digital products of said multiplications; and
- further comprising means for supplying said video signal and means for inserting said synchronizing signal at a predetermined interval in said video signal;
- wherein said means for supplying a video signal supplies digital values representing the amplitude of a video signal, said digital values being supplied synchronously with a clock signal; and
- wherein said means for supplying a video signal, said second means and said means for multiplying all are coupled to the same clock signal which controls the timing of the output of said digital video data from said means for supplying said video signal; and
- wherein said first means includes means for generating a reference signal indicating the time and interval of said synchronizing signal and wherein said means for inserting is a multiplexing means having a first input coupled to said means for supplying a video signal and having a second input coupled to said first means, and having a control input coupled to said means for supplying a reference signal and having an output, said multiplexing means for coupling either said first input or said second input to said output depending upon the state of said reference signal, said multiplying means further comprising a digital multiplier having a first input coupled to said output of said multiplexer and having a second input coupled to said second means; and
- further comprising means for converting said digital products from said multiplier to an analog synchronizing signal; and
- wherein said means for converting is a digital to analog converter having its input coupled to said multiplier and having an output and a low pass filter having its input coupled to the output of said digital to analog converter; and
- wherein said digital products from said multiplier comprise a television signal and wherein said filter has an upper corner frequency approximately equal to two times the color subcarrier frequency and an upper stop band that rolls off to at least minus six decibels at a frequency of two times the color subcarrier frequency and to at least minus fifty-five decibels at a frequency of three times the color subcarrier frequency.

26. An apparatus for digitally generating a synchronizing signal for a video signal represented by digital video data comprising:

first means for supplying digital signal values which represent the amplitude peaks of said synchronizing signal;

second means for supplying digital gain control values which are a digital representation of the edge shape of said synchronizing signal, said gain control values occurring during the interval defined by the commencement and conclusion of each synchronizing signal interval;

means for multiplying the digital values from said first means times the digital values from said second means and for outputting digital signal values representing the digital products of said multiplications; and further comprising means for supplying said video signal and means for inserting said synchronizing signal at a predetermined interval in said video signal;

wherein said means for supplying a video signal supplies digital values representing the amplitude of a video signal, said digital values being supplied synchronously with a clock signal; and wherein said means for supplying a video signal, said second means and said means for multiplying all are coupled to the same clock signal which controls the timing of the output of said digital video data from said means for supplying said video signal; and wherein said first means includes means for generating a reference signal indicating the time and interval of said synchronizing signal and wherein said means for inserting is a multiplexing means having a first input coupled to said means for supplying a video signal and having a second input coupled to said first means, and having a control input coupled to said means for supplying a reference signal and having an output, said multiplexing means for coupling either said first input or said second input to said output depending upon the state of said reference signal, said multiplying means further comprising a digital multiplier having a first input coupled to said output of said multiplexer and having a second input coupled to said second means; and further comprising means in said means for supplying a video signal for converting the video signal to a two's complement digital representation where the zero level is at the blanking level of a television synchronization signal.

27. The apparatus of claim 26 wherein said two's complement digital representations have a positive sign assigned for values of increasing luminance and have a negative sign for all values more negative than the blanking level.

28. An apparatus for digitally generating a synchronizing signal having edges of predetermined shape for insertion into a video signal to form a composite video signal and for digitally controlling the gain of said video signal comprising:

means for sequentially generating a plurality of addresses;

memory means for storing a digital value at each said address, said digital values having magnitudes which define the shape of said edges of said synchronizing signal and for outputting the digital value stored at each said address when said address is generated; and peak amplitude definition means for generating digital data in the form of at least one digital value representing the peak amplitude of said synchronizing signal;

means for multiplying having a first input coupled to receive said digital values from said memory means and having a second input coupled to receive digital data from said peak amplitude definition means, for multiplying each said digital value at said first input times said digital data at said second input which has a predetermined amplitude at least during the times said digital values are being output so as to output digital data representing the desired synchronizing signal; and means for sharing said means for multiplying for video signal gain control purposes by accepting video data defining said video signal and accepting gain control data defining the desired gain for said video signal and for coupling both said video data and said gain control data to said means for multiplying during intervals when said synchronizing signals are not being generated for multiplication thereby altering the gain of said video signal represented by said video data.

29. The apparatus of claim 28 wherein said means for sequentially generating addresses generates said addresses in synchronization with a reference clock signal in a digital video system.

30. The apparatus of claim 29 wherein said reference clock is the sample clock signal in a digital time base corrector.

31. The apparatus of claim 28 wherein said memory means stores digital values defining the shape of the edges of blanking and synchronization pulses in a video system.

32. The apparatus of claim 31 wherein said memory means also stores digital values defining the shape of the burst envelope in a video system.

33. The apparatus of claim 28 wherein said memory means is non-volatile memory.

34. The apparatus of claim 28 further comprising a port for receiving digital gain control data and means for switching said first input of said means for multiplying to a source of digitized video data representing said video signal and for switching said second input to said port for receipt of said digital gain control data during predetermined times.

35. An apparatus for digitally generating a synchronizing signal having edges of predetermined shape for insertion into a video signal to form a composite video signal comprising:

means for sequentially generating a plurality of addresses;

memory means for storing a digital value at each said address, said digital values having magnitudes which define the shape of said edges of said synchronizing signal and for outputting the digital value stored at each said address when said address is generated; and peak amplitude definition means for generating digital data in the form of at least one digital value representing the peak amplitude of said synchronizing signal;

means for multiplying having a first input coupled to receive said digital values from said memory means and having a second input coupled to receive digital data from said peak amplitude definition means, for multiplying each said digital value at said first input times said digital data at said second input which has a predetermined amplitude at least during the times said digital values are being output so as to output digital data representing the desired synchronizing signal; and further comprising a port for receiving digital gain control data and means for switching said first input of said means for multiplying to a source of digitized video data representing said video signal and for switching said second input to said port for receipt of said digital gain control data during predetermined times; and further comprising means for converting said digitized video data to a 2's complement number having a magnitude of zero at the blanking level and positive values for video levels of greater luminance and negative values for levels more negative than a television synchronization blanking level.

36. The apparatus of claim 28 wherein said digital values define a sine squared edge shape.

37. The apparatus of claim 28 wherein said peak amplitude definition means includes signal generating means for generating said digital data at said second input so as to represent a predetermined fixed amplitude starting from a time before thetime when the synchronizing signal is supposed to occur in the composite video signal and ending after the end of each said synchronizing signal.

38. The apparatus of claim 37 further comprising means in said signal generation means for generating digital data representing the peak amplitudes of a burst synchronizing signal at said second input starting from a time before the time when the burst synchronization signal is supposed to occur in the composite video signal and ending at a time after the burst synchronization signal is supposed to end in the composite video signal.

39. The apparatus of claim 38 further comprising means for switching said second input to receive the signal from said signal generation means at a predetermined time approximately equal to the interval during which the leading edge of the horizontal blanking pulse in the incoming video signal occurs.

40. A method of digitally forming a precisely shaped synchronizing signal having predetermined shapes for the leading and trailing edges thereof for a video signal represented by digital video data and for digitally controlling the gain of said video signal comprising the steps of:
generating a first digital signal representing a predetermined peak amplitude for said synchronizing signal, said peak amplitude digital signal being generated starting at a time from before said leading edge is to start and ending after said trailing edge is to end; and
generating a plurality of sync gain control digital values defining the shape of said leading and trailing edges;
multiplying in a multiplier having two ports said first digital signal by said plurality of digital sync gain control values to generate a digital representation of said synchronizing signal;
switching said first port of said multiplier to receive said digital video data and coupling digital video gain control values to said second port at one or more times when said synchronizing signal is not being generated; and
multiplying said digital video data by said digital video gain control values to digitally control the gain of said video signal.

41. The method of claim 40 wherein said first generating step includes the step of generation of said signal which represents the peak amplitude of a blanking pulse in a video system and which has a duration which overlaps the edges of a blanking pulse in a video system and further comprises the step of multiplying said signal by a plurality of gain control numbers at a first time to define said leading edge and multiplying said signal by a plurality of gain control numbers at a second time to define said trailing edge.

42. The method of claim 40 wherein said first generating step includes generation of a signal which represents the peak amplitude of a sync pulse in a video system and which has a duration which overlaps the sync pulse in a video system and further comprises the step of multiplying said signal by a plurality of gain control numbers at a first time to define said leading edge and multiplying said signal by a plurality of gain control numbers at a second time to define said trailing edge.

43. The method of claim 40 wherein said first generating step includes generation of a signal which represents alternately the peaks amplitudes and base line of a burst signal in a video system and which hash a duration which overlaps the burst period in a video system and further comprises the step of multiplying said signal by a plurality of gain control numbers at a first time to define said leading edge of a burst envelope and multiplying said signal by a plurality of gain control numbers at a second time to define said trailing edge of the burst envelope.

44. A process for digitally generating synchronization signals for a video signal and for digitally controlling the gain of said video signal comprising the steps of:
generating a first plurality of digital signal values representative of the amplitude peaks of said synchronizing signal;
generating a second plurality of digital signal values in predetermined synchronization with the generation of said first plurality of digital signal values, said second plurality of digital signal values representative of the desired shapes of the edges of said synchronization signal; and
multiplying in a two port multiplier the first and second pluralities of digital signal values to derive a plurality of digital product values representative of the shape and amplitude of the desired synchronization signal;
switching said two ports of said multiplier to receive digital data representing said video data signal and digital video gain control data representing the desired gain of said video signal and multiplying the data at said two ports together during times when said multiplier is not being used to generate said digital product values representing said shape and amplitude of said desired synchronization signal so as to digitally control the gain of said video signal.

45. The process of claim 44 wherein said second plurality of digital signal values is a single set of values which are used to define the shape of each edge of said synchronization signal.

46. A process for digitally generating synchronization signals comprising the steps of:
generating a first plurality of digital signal values representative of the amplitude peaks of said synchronizing signal;
generating a second plurality of digital signal values in predetermined synchronization with the generation of said first plurality of digital signal values, said second plurality of digital signal values representative of the desired shapes of the edges of said synchronization signal;

multiplying the first and second pluralities of digital signal values to derive a plurality of digital product values representative of the shape and amplitude of the desired synchronization signal;

wherein said second plurality of digital signal values is a single set of values which are used to define the shape of each edge of said synchronization signal; and wherein said second plurality of digital signal values are between 0 and 1 in the decimal number system and further comprising the step of complementing said second plurality of digital signal values by subtracting them from one before multiplication when forming predetermined edges.

47. The process of claim 46 wherein said second plurality of digital signal values is stored in a memory and wherein the step of generating said second plurality of digital signal values includes the steps of sequentially accessing said second plurality of digital signal values from said memory in a predetermined sequence when generating a first selected edge and accessing said second plurality of digital signal values from said memory in the reverse sequence when forming a second selected edge.

48. The process of claim 45 wherein said synchronization signal is a television synchronization signal and said second plurality of digital signal values represents the shape of sine$^2$ edge and each edge in said television synchronization signal has this shape.

49. The process of claim 44 further comprising the steps of:
converting a video signal into a third plurality of digital video signal values using a predetermined clock signal;
generating said first and second plurality of digital signal values in synchronization with said clock signal;
injecting the first plurality of digital signal values into the stream of said third plurality of digital video signal values during selected intervals;
multiplying said first and second plurality of digital signal values in synchronization with said clock signal during said selected intervals to generate a plurality of digital product values which define said synchronizaton signals.

50. A process for digitally generating synchronization signals comprising the steps of:
generating a first plurality of digital signal values representative of the amplitude peaks of said synchronizing signal;
generating a second plurality of digital signal values in predetermined synchronization with the generation of said first plurality of digital signal values, said second plurality of digital signal values representative of the desired shapes of the edges of said synchronization signal; and
multiplying the first and second pluralities of digital signal values to derive a plurality of digital product values representative of the shape and amplitude of the desired synchronization signal; and
further comprising the steps of:
converting a video signal into a third plurality of digital video signal values using a predetermined clock signal;
generating said first and second plurality of digital signal values in synchronization with said clock signal;
injecting the first plurality of digital signal values into the stream of said third plurality of digital video signal values during selected intervals;
multiplying said first and second plurality of digital signal values in synchronization with said clock signal during said selected intervals to generate a plurality of digital product values which define said synchronization signals; and
further comprising the step of converting the resultant output stream of digital product values after said injection step to analog values in a digital to analog converter operating in synchronization with said clock signal and passing the analog output so generated through a low pass filter wherein said filter has an upper corner frequency approximately equal to two times the color subcarrier frequency and an upper stop band that rolls off to at least minus six decibels at a frequency of two times the color subcarrier frequency and to at least minus fifty-five decibels at a frequency of three times the color subcarrier frequency.

51. The process of claim 50 further comprising the step of multiplying said third plurality of digital video signal values by a digital gain number or a changing stream of digital gain numbers at the option of the user during times when said injection step is not occurring.

52. A process for digitally generating synchronization signals comprising the steps of:
generating a first plurality of digital signal values representative of the amplitude peaks of said synchronizing signal;
generating a second plurality of digital signal values in predetermined synchronization with the generation of said first plurality of digital signal values, said second plurality of digital signal values representative of the desired shapes of the edges of said synchronization signal; and
multiplying the first and second pluralities of digital signal values to derive a plurality of digital product values representative of the shape and amplitude of the desired synchronization signal; and
further comprising the steps of:
converting a video signal into a third plurality of digital video signal values using a predetermined clock signal;
generating said first and second plurality of digital signal values in synchronization with said clock signal;
injecting the first plurality of digital signal values into the stream of said third plurality of digital video signal values during selected intervals;
multiplying said first and second plurality of digital signal values in synchronization with said clock signal during said selected intervals to generate a plurality of digital product values which define said synchronization signals; and
wherein said digital product values define a sync signal and a burst synchronization signal comprised of a plurality of cycles of subcarrier signal and further comprising the step of interpreting a signal from the user regarding the desired sync to subcarrier phase and for generating said second plurality of digital signal values so as to create digital product values which represent synchronizing signals having the desired sync to subcarrier phase.

53. The method of claim 52 further comprising the steps of interpreting a signal from the user regarding the desired video gain and generating a digital video gain control value and multiplying said third plurality of digital signal values representing the video information by said video gain control value when said first plurality of digital signal values are not being injected and using said video gain control value to control the generation of said second plurality of digital signal values so as to define a proper edge shape and rise time for a blanking synchronizing signal included in said synchronizing signals so that said blanking synchronizing signal is properly shaped for the selected level of video gain.

* * * * *